US012477303B2

United States Patent
Wong et al.

(10) Patent No.: US 12,477,303 B2
(45) Date of Patent: *Nov. 18, 2025

(54) LOCATION SERVER, INFRASTRUCTURE EQUIPMENT, COMMUNICATIONS DEVICE AND METHODS FOR THE USE OF SUPPLEMENTARY POSITIONING REFERENCE SIGNALS

(71) Applicant: Sony Group Corporation, Tokyo (JP)

(72) Inventors: Shin Horng Wong, Basingstoke (GB); Martin Warwick Beale, Basingstoke (GB); Brian Alexander Martin, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 313 days.

This patent is subject to a terminal disclaimer.

(21) Appl. No.: 18/147,723

(22) Filed: Dec. 29, 2022

(65) Prior Publication Data

US 2023/0179956 A1     Jun. 8, 2023

Related U.S. Application Data

(63) Continuation of application No. 16/324,917, filed as application No. PCT/EP2017/067987 on Jul. 17, 2017, now Pat. No. 11,570,577.

(30) Foreign Application Priority Data

Aug. 12, 2016    (EP) .................................... 16184042

(51) Int. Cl.
*H04W 24/00*      (2009.01)
*G01S 5/00*        (2006.01)
(Continued)

(52) U.S. Cl.
CPC ........... *H04W 4/029* (2018.02); *G01S 5/0081* (2013.01); *G01S 5/14* (2013.01); *H04B 17/21* (2015.01);
(Continued)

(58) Field of Classification Search
CPC ....... H04W 4/029; H04W 4/20; G01S 5/0081; G01S 5/14; H04B 17/21; H04L 5/0051; H04L 67/52; H04M 1/72412
See application file for complete search history.

(56) References Cited

U.S. PATENT DOCUMENTS 6,356,763 B1 * 3/2002 Kangas ................. H04W 64/00 370/324
6,484,031 B1 * 11/2002 Ruutu ................... H04W 64/00 342/463
(Continued)

FOREIGN PATENT DOCUMENTS

| KR | 10-2014-0009480 A | 1/2014 |
| KR | 10-2015-0100759 A | 9/2015 |
| KR | 10-2016-0030976 A | 3/2016 |

OTHER PUBLICATIONS

3GPP, "Technical Specification Group Radio Access Network; Evolved Universal Terrestrial Radio Access (E-UTRA); LTE Positioning Protocol (LPP)", 3GPP TS 36.355 V13.1.0, Release 13, Mar. 2016, pp. 1-141.

(Continued)

*Primary Examiner* — Stephen M D'Agosta
(74) *Attorney, Agent, or Firm* — XSENSUS LLP

(57) ABSTRACT

A location server configured to determine a location of communications devices with respect to a location of infrastructure equipment of a wireless access network from observed time differences between receiving positioning reference signals transmitted by a plurality of the infrastruc-
(Continued)

ture equipment and received by the communications devices.

14 Claims, 13 Drawing Sheets

(51) Int. Cl.
    *G01S 5/14*     (2006.01)
    *H04B 17/21*     (2015.01)
    *H04L 5/00*     (2006.01)
    *H04M 1/72412*     (2021.01)
    *H04W 4/029*     (2018.01)
    *H04L 67/52*     (2022.01)
    *H04W 4/20*     (2018.01)

(52) U.S. Cl.
    CPC ...... *H04L 5/0051* (2013.01); *H04M 1/72412* (2021.01); *H04L 67/52* (2022.05); *H04W 4/20* (2013.01)

(56) References Cited

U.S. PATENT DOCUMENTS

| | | | | |
|---|---|---|---|---|
| 8,370,629 | B1* | 2/2013 | Ngo | H04L 63/126 |
| | | | | 713/168 |
| 8,730,925 | B2* | 5/2014 | Frank | G01S 5/10 |
| | | | | 370/336 |
| 9,037,155 | B2* | 5/2015 | Fischer | G01S 5/14 |
| | | | | 455/67.11 |
| 9,432,164 | B2* | 8/2016 | Chen | H04L 5/0023 |
| 9,435,874 | B2* | 9/2016 | Edge | G01S 5/0018 |
| 9,699,605 | B1* | 7/2017 | Gordon | H04W 24/10 |
| 9,713,117 | B2* | 7/2017 | Khoryaev | H04W 64/00 |
| 9,781,259 | B1 | 10/2017 | Kodaypak | |
| 9,949,067 | B2 | 4/2018 | Bitra | |
| 9,986,526 | B2 | 5/2018 | Khandekar et al. | |
| 10,004,057 | B2 | 6/2018 | Chae | |
| 10,262,373 | B2* | 4/2019 | Hayward | G06Q 40/08 |
| 10,324,162 | B2* | 6/2019 | Morioka | G01S 5/01 |
| 2002/0151314 | A1 | 10/2002 | Nohara | |
| 2003/0040323 | A1* | 2/2003 | Pihl | H04W 64/00 |
| | | | | 342/357.31 |
| 2003/0096624 | A1* | 5/2003 | Ormson | G01S 5/10 |
| | | | | 455/456.1 |
| 2003/0139188 | A1* | 7/2003 | Chen | G01S 5/0268 |
| | | | | 455/450 |
| 2003/0190919 | A1* | 10/2003 | Niemenmaa | G01S 5/0273 |
| | | | | 455/435.1 |
| 2003/0216142 | A1* | 11/2003 | Wigren | H04W 64/00 |
| | | | | 455/456.3 |
| 2004/0067759 | A1* | 4/2004 | Spirito | H04W 64/00 |
| | | | | 455/433 |
| 2004/0082344 | A1* | 4/2004 | Moilanen | H04W 64/00 |
| | | | | 455/456.3 |
| 2004/0185865 | A1* | 9/2004 | Maanoja | H04W 64/00 |
| | | | | 455/433 |
| 2005/0113111 | A1* | 5/2005 | Dupont | H04W 64/00 |
| | | | | 455/456.1 |
| 2005/0136938 | A1* | 6/2005 | Kang | H04W 64/00 |
| | | | | 455/452.2 |
| 2006/0183484 | A1 | 8/2006 | Ruutu et al. | |
| 2007/0182547 | A1 | 8/2007 | Wachter et al. | |
| 2008/0228654 | A1 | 9/2008 | Edge | |
| 2008/0233931 | A1 | 9/2008 | Shim | |
| 2009/0233621 | A1* | 9/2009 | Rhoads | G01S 5/0081 |
| | | | | 455/456.1 |
| 2009/0253440 | A1 | 10/2009 | Edge | |
| 2010/0246485 | A1* | 9/2010 | Potkonjak | G01S 1/028 |
| | | | | 370/328 |
| 2010/0317343 | A1 | 12/2010 | Krishnamurthy | |
| 2011/0059751 | A1 | 3/2011 | Zhang et al. | |
| 2011/0075621 | A1 | 3/2011 | Sung et al. | |
| 2011/0117926 | A1* | 5/2011 | Hwang | H04W 64/00 |
| | | | | 455/456.1 |
| 2011/0124347 | A1* | 5/2011 | Chen | H04W 64/00 |
| | | | | 455/456.1 |
| 2011/0171969 | A1 | 7/2011 | Halivaara et al. | |
| 2011/0177777 | A1* | 7/2011 | Kim | H04B 7/155 |
| | | | | 455/9 |
| 2011/0250905 | A1 | 10/2011 | Wigren | |
| 2012/0040685 | A1* | 2/2012 | Escolar-Piedras | G01S 5/10 |
| | | | | 455/456.1 |
| 2012/0040687 | A1* | 2/2012 | Siomina | H04W 24/00 |
| | | | | 455/422.1 |
| 2012/0046030 | A1* | 2/2012 | Siomina | H04W 24/02 |
| | | | | 455/423 |
| 2012/0052872 | A1* | 3/2012 | Do | G01S 5/18 |
| | | | | 455/456.1 |
| 2012/0088518 | A1 | 4/2012 | Edge | |
| 2012/0165053 | A1* | 6/2012 | Yoon | H04L 5/0048 |
| | | | | 455/501 |
| 2012/0258730 | A1* | 10/2012 | Tinnakornsrisuphap | |
| | | | | G01S 5/0215 |
| | | | | 455/456.1 |
| 2012/0258733 | A1 | 10/2012 | Fischer et al. | |
| 2012/0329480 | A1 | 12/2012 | Hashimoto et al. | |
| 2013/0177006 | A1 | 7/2013 | Baek et al. | |
| 2013/0217408 | A1* | 8/2013 | DiFazio | H04W 4/02 |
| | | | | 455/456.1 |
| 2013/0301439 | A1 | 11/2013 | Heo et al. | |
| 2013/0324154 | A1 | 12/2013 | Raghupathy et al. | |
| 2014/0016621 | A1* | 1/2014 | Zhang | H04W 56/0055 |
| | | | | 370/336 |
| 2014/0066092 | A1* | 3/2014 | Scheim | H04W 24/10 |
| | | | | 455/456.1 |
| 2014/0176366 | A1* | 6/2014 | Fischer | G01S 5/10 |
| | | | | 342/374 |
| 2014/0211620 | A1 | 7/2014 | Kubota et al. | |
| 2014/0213289 | A1* | 7/2014 | Xiao | H04W 48/18 |
| | | | | 455/456.1 |
| 2014/0295884 | A1* | 10/2014 | Racz | H04W 24/10 |
| | | | | 455/456.1 |
| 2015/0018010 | A1 | 1/2015 | Fischer | |
| 2015/0105097 | A1* | 4/2015 | Sun | G01S 5/06 |
| | | | | 455/456.1 |
| 2015/0195674 | A1* | 7/2015 | Opshaug | G01S 5/02 |
| | | | | 455/456.6 |
| 2015/0296359 | A1 | 10/2015 | Edge | |
| 2015/0365790 | A1 | 12/2015 | Edge et al. | |
| 2015/0369901 | A1* | 12/2015 | Josefiak | H04B 17/318 |
| | | | | 455/456.5 |
| 2016/0117909 | A1* | 4/2016 | Rajala | G08B 21/22 |
| | | | | 340/573.4 |
| 2016/0150376 | A1* | 5/2016 | Chiou | H04W 4/025 |
| | | | | 455/456.2 |
| 2017/0041886 | A1* | 2/2017 | Baker | H04W 52/0245 |
| 2017/0148243 | A1* | 5/2017 | Shin | G07C 9/00309 |
| 2018/0242101 | A1 | 8/2018 | Lin et al. | |

OTHER PUBLICATIONS

3GPP, "Technical Specification Group Radio Access Network; Study on indoor positioning enhancements for UTRA and LTE", 3GPP TR 37.857 V13.1.0, Release 13, Dec. 2015, pp. 1-82.

Ericsson, "Text proposal for PRS pattern enhancement for indoor positioning", 3GPP TSG RAN WG1 Meeting No. 81, R1-153607, Fukuoka, Japan, May 25-29, 2015, pp. 1-7.

Ericsson, "Text Proposal and Discussion on Further enhancements for OTDOA", 3GPP TSG RAN WG1 Meeting No. 82, R1-153744, Beijing, China, Aug. 24-28, 2015, pp. 1-9.

Sony, "OTDoA enhancements for feMTC", 3GPP TSG RAN WG1 Meeting No. 86bis R1-1608950, Lisbon, Portugal Oct. 10-14, 2016, 5 pages.

Holma et al., "LTE for UMTS OFDMA and SC-FDMA Based Radio Access", System Architecture based on 3GPP SAE, ISBN 978-0-470-99401-6, Wiley 2009, 11 pages.

(56) References Cited

OTHER PUBLICATIONS

Ericsson, "New WI proposal on Further Enhanced MTC", 3GPP TSG RAN Meeting No. 72, RP-161321 revision of RP-161319, Busan, Korea, Jun. 13-16, 2016, 7 pages.
Vodafone, Huawei, Hisilicon, Ericsson, Qualcomm, "New work item proposal: Enhancements of Nb-Iot", 3GPP TSG RAN Meeting No. 72, RP-161324, Busan, Korea, Jun. 13-16, 2016, 8 pages.
3GPP, "Technical Specification Group Radio Access Network; Evolved Universal Terrestrial Radio Access (E-UTRA); Requirements for Support of Radio Resource Management", 3GPP TS 36.133 V13.3.0, Release 13, Mar. 2016, pp. 1-47.
International Search Report mailed on Nov. 13, 2017 for PCT/EP2017/067987 filed on Jul. 17, 2017, 11 pages.

* cited by examiner

Triangulation to determine UE's location

Positioning occasion and period

S-PRS transmission in addition to PRS

UMTS procedure for Reporting Event 7b

Stationary and moving dogs

UE flow chart for determining when to perform
positioning measurements, according to an example implementation Impact of UE trajectory on triggering measurements Flowchart showing how the UE determines whether a change in a measurement (e.g. RSRP) triggers a full RSTD positioning measurement Example locations with the same RSTD, but different power delay profiles Reporting RSTD triggering measurements Two-step reporting of triggered measurements and positioning measurements

LOCATION SERVER, INFRASTRUCTURE EQUIPMENT, COMMUNICATIONS DEVICE AND METHODS FOR THE USE OF SUPPLEMENTARY POSITIONING REFERENCE SIGNALS

CROSS-REFERENCE TO RELATED APPLICATIONS

The present application is a continuation of U.S. application Ser. No. 16/324,917, filed Feb. 12, 2019, which is a 317 of PCT filing PCT/EP2017/067987, filed Jul. 17, 2017, and claims priority to 16184042.6, filed in the European Patent Office on Aug. 12, 2016, the entire contents of each of which are being incorporated herein by reference.

TECHNICAL FIELD OF THE DISCLOSURE

The present disclosure relates to location servers which are configured to determine a location of communication devices from reported observed time differences between reception of positioning reference signals reported by the communications device. The positioning reference signals are transmitted by a plurality of infrastructure equipment of a wireless communications network and the observed time differences are reported to the location server by the communications devices via the wireless communications network. The present disclosure also relates to infrastructure equipment, communications devices and methods of determining a location of communications devices.

BACKGROUND OF THE DISCLOSURE

Third and fourth generation mobile telecommunication systems, such as those based on the 3GPP defined UMTS and Long Term Evolution (LTE) architecture are able to support sophisticated services with an improved radio interface and enhanced data rates. However, whilst fourth generation networks can support communications at high data rates and low latencies from devices such as smart phones and tablet computers, it is expected that future wireless communications networks will need to support communications to and from a much wider range of devices, including reduced complexity devices, machine type communication devices, devices which require little or no mobility, high resolution video displays and virtual reality headsets. As such there is expected to be an increase in the variety of communications devices as well as the number of devices served by a cell. Indeed, the so-called internet-of-things envisages many low power or low cost devices being used.

In the case of reduced bandwidth and/or capability devices, a narrow band IoT (NB-IoT) communications device can be used to communicate low bandwidth data to support a variety of low data rate applications. As such, Enhanced Machine Type Communications (eMTC) devices can be created from such low cost devices which are both power efficient and can operate in an extended coverage mode, for example such as inside basements. One of the applications for such low cost devices is to improve a facility for tracking objects to which such communications devices are attached by tracking a location of the devices so that the objects themselves can be tracked.

One location technique which has been previously proposed is based on determining a location of communications devices from reports of an observed time difference between receiving known reference signals which have been transmitted by a plurality of base stations of a wireless communications network. The communications device reported the observed time difference of arrival to a location server attached to the wireless communications network. The Location Server calculates the location of the communications device based on these observed time differences of received reference signals to the wireless communications network. The location server can then perform a triangulation technique based on a determined distance from each of the base stations based on the observed time differences to determine the location of the communications device. However a desire for low cost and low power communications devices can present new challenges.

SUMMARY OF THE DISCLOSURE

Embodiments of the present technique can provide an arrangement in which a location server is configured to cause infrastructure equipment of a wireless communications network to transmit supplementary positioning reference signals to produce additional or improved observed time difference reports for one or more communications devices selectively. Embodiments of the present technique can also provide communications devices which are configured to measure their relative rate of movement and to adapt a rate of determining observed time differences of receiving positioning reference signals from a plurality of infrastructure equipment in proportion to the relative rate of movement and/or to adapt a rate of transmitting the observed time differences to a wireless communications network in accordance with the relative rate of movement. In some examples, the communications device may determine that the relative rate of movement measured corresponds to a stationary communications device and so suspends determining the observed time differences and/or transmitting the observed time differences to the wireless communications network.

Various further aspects and embodiments of the disclosure are provided in the appended claims, including but not limited to, a communications device, infrastructure equipment, mobile communications system and a method of determining a location of a communications device.

BRIEF DESCRIPTION OF DRAWINGS

Embodiments of the present disclosure will now be described by way of example only with reference to the accompanying drawings in which like parts are provided with corresponding reference numerals and in which.

DESCRIPTION OF EXAMPLE EMBODIMENTS

Conventional LTE Network

Figure 1:
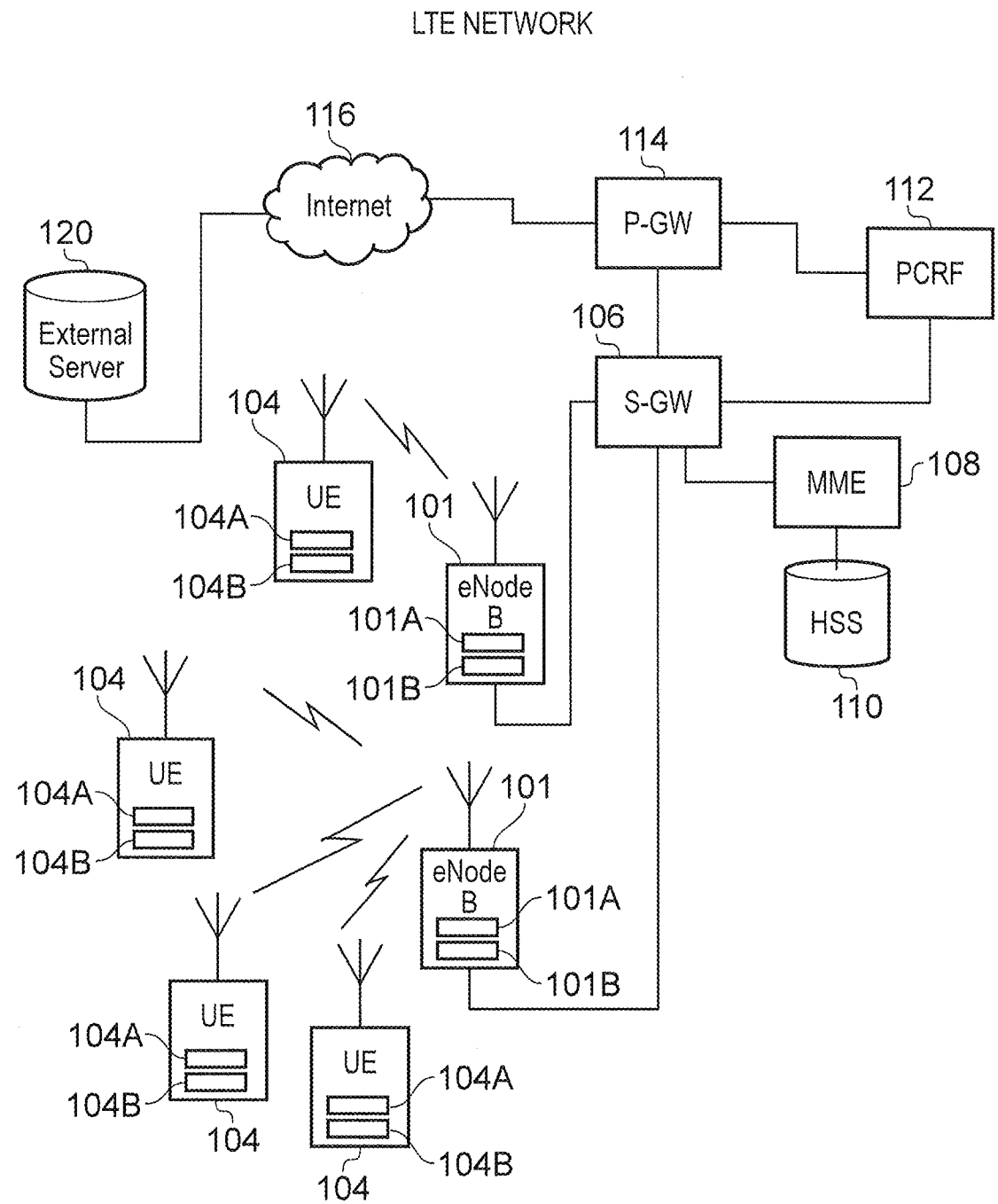
FIG. 1 provides a schematic block diagram illustrating an example wireless communications system according to an LTE standard.

Example embodiments of the present technique will now be described with reference to wireless access networks configured in accordance with LTE standards as defined by the 3GPPP. However it will be appreciated that this is just one example and embodiments of the present technique are not limited to LTE standards, but find applications with other radio access technologies and standards. FIG. 1 provides a schematic diagram illustrating some basic functionality of a wireless communications network/system. Various elements of FIG. 1 and their respective modes of operation are well-known and defined in the relevant standards administered by the 3GPP (RTM) body, and also described in many books on the subject, for example, Holma H. and Toskala A [1]. It will be appreciated that operational aspects of the communications network which are not specifically described below may be implemented in accordance with any known techniques, for example according to the relevant standards such as those according to 3GPP Long Term Evolution (LTE) standards.

The wireless communications system shown in FIG. 1 includes infrastructure equipment including base stations 101. The infrastructure equipment 101 may also be referred to as a base station, network element, enhanced NodeB (eNodeB (eNB)) or a coordinating entity for example, and provides a wireless access interface to the one or more communications devices within a coverage area or cell. One or more mobile communications devices 104 may communicate data via the transmission and reception of signals representing data using the wireless access interface. The core network 102 may also provide functionality including authentication, mobility management, charging and so on for the communications devices served by the network entity. Each infrastructure equipment comprises a transceiver unit 101A for transmission and reception of communications between the respective infrastructure equipment and communication devices and a processor unit 101B configured to control the operation of the respective infrastructure equipment.

The mobile communications devices 104 of FIG. 1 may also be referred to as communications terminals, user equipment (UE), terminal devices and so forth, and are configured to communicate with one or more other communications devices served by the same or a different coverage area via the network entity. These communications may be performed by transmitting and receiving signals representing data using the wireless access interface over the two way communications links. Each communications device comprises a transceiver unit 104A for transmission and reception of communications between the respective communication devices and infrastructure equipment and a processor unit 104B configured to control the operation of the respective communication devices.

As shown in FIG. 1 eNB's 101 are connected to a serving gateway S-GW 106 which is arranged to perform routing and management of mobile communications services to the communications devices 104 as they roam throughout the mobile radio network. In order to maintain mobility management and connectivity, a mobility management entity (MME) 108 manages the enhanced packet service (EPS) connections with the communications devices 104 using subscriber information stored in a home subscriber server (HSS) 110. Other core network components include the policy charging and resource function (PCRF) 112 a packet data gateway (P-GW) 114 which connects to an internet network 116 and finally to an external server 120. More information may be gathered for the LTE architecture from the book entitled "*LTE for UMTS OFDN and SC-FDMA based radio access*", Holma H. and Toskala A. page 25 ff.

Determining a Location of a Communications Devices

It has been envisaged that communications devices can be arranged to form an Internet of Things (IoT) or, in the case of reduced bandwidth or capability devices, a narrow band IoT (NB-IoT). Enhanced Machine Type Communications (eMTC) devices can be created from low cost devices which are power efficient and can operate in extended coverage, for example such as inside basements. One of the applications for such low cost devices is to improve a facility for tracking objects to which such communications devices are attached and tracking a location of the devices so that the objects themselves can be tracked.

One location technique which has been previously proposed is known as Observed Time Difference Of Arrival (OTDOA), where the communications device or UE measures a Reference Signal Time Difference (RSTD). The RSTD is an observed time difference between a target eNodeB transmitted reference signal and a transmission of a reference signal by a reference eNodeB. The UE measures the RSTD for reference signals transmitted by two or more eNodeBs, which would involve three or more eNodeBs, because one of them is the reference eNodeB and transmitting these measured RSTD to a location server attached to the wireless communications network. The Location Server calculates the UE position based on these RSTD measurements using the known location of the eNodeBs involved. That is, the location server performs a triangulation process by determining a location of the UE from a relative time difference from each of the eNodeBs, involving at least three eNodeBs, to determine the UE location as shown in FIG. 2.

Figure 2:
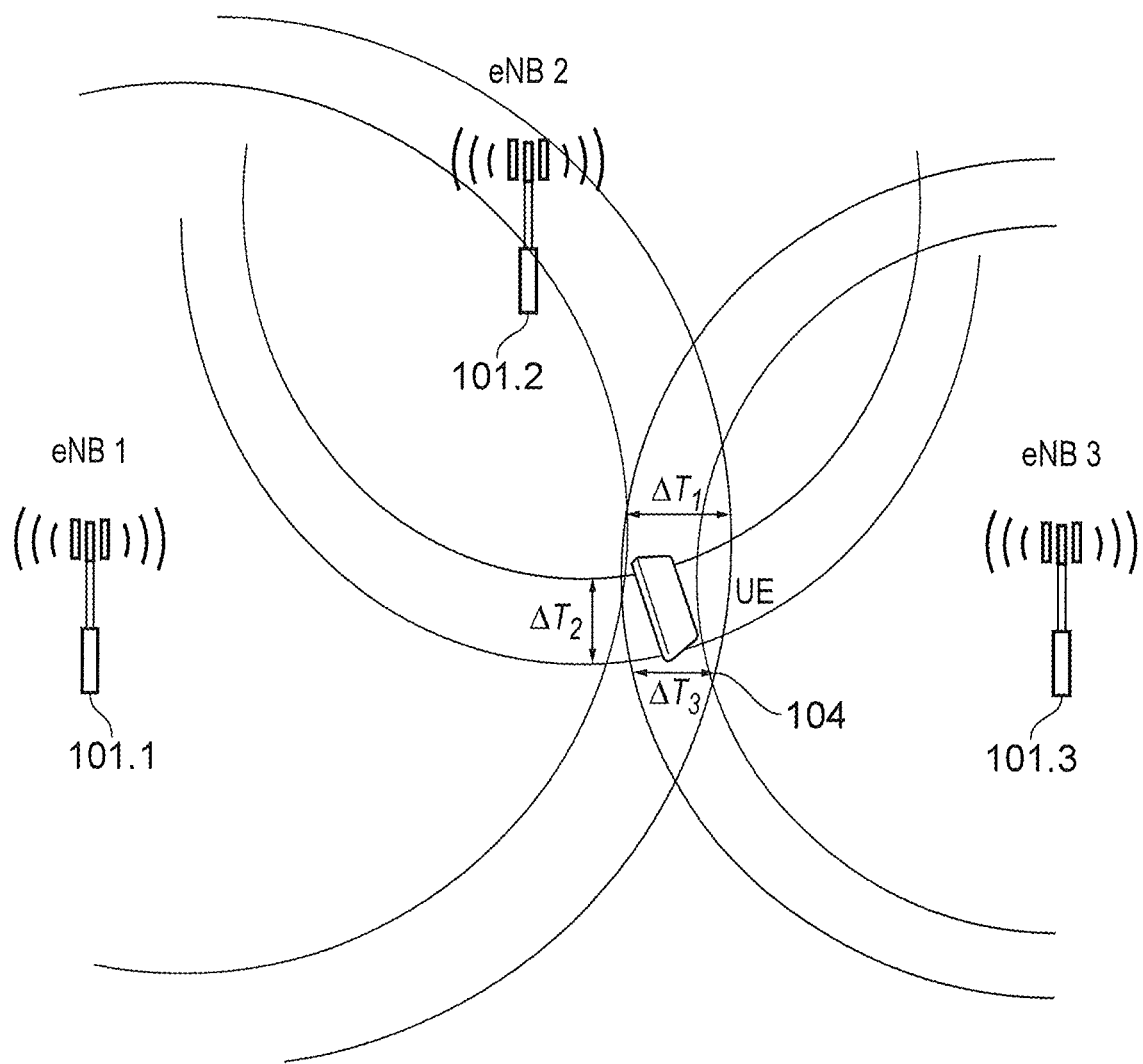
FIG. 2 provides an illustrative representation of an arrangement in which a location of a communications device (UE) can be determined from a difference in an observed time of arrival of positioning reference signals transmitted by a plurality of base stations (three eNodeBs shown)

As shown in FIG. 2, three eNodeBs 101.1, 101.2, 101.3 are shown. Each of the eNodeBs 101.1, 101.2, 101.3 is configured to transmit reference signals at the same time, which are then received by a communications device or UE 104 at different times. A location server receiving a report of the difference times can determine the UE's location in accordance with a conventional triangulation technique to determine a location of the UE 104 with respect to a known location of the eNodeBs 101.1, 101.2, 101.3. An accuracy with which the location of the UE 104 can be estimated is dependent upon an accuracy with which the RSTD is measured by the UE 104 from the received reference signals. For example, in FIG. 2, the time of arrival from eNodeB 101.1 has an accuracy of $\Delta T_1$, the time of arrival of eNodeB 101.2 has an accuracy of $\Delta T_2$ and the time of arrival for eNodeB 101.3 has an accuracy of $\Delta T_3$. The accuracy of the time of arrival measurement is dependent upon the quality of the measured reference signals and the bandwidth of the reference signals.

Figure 3:
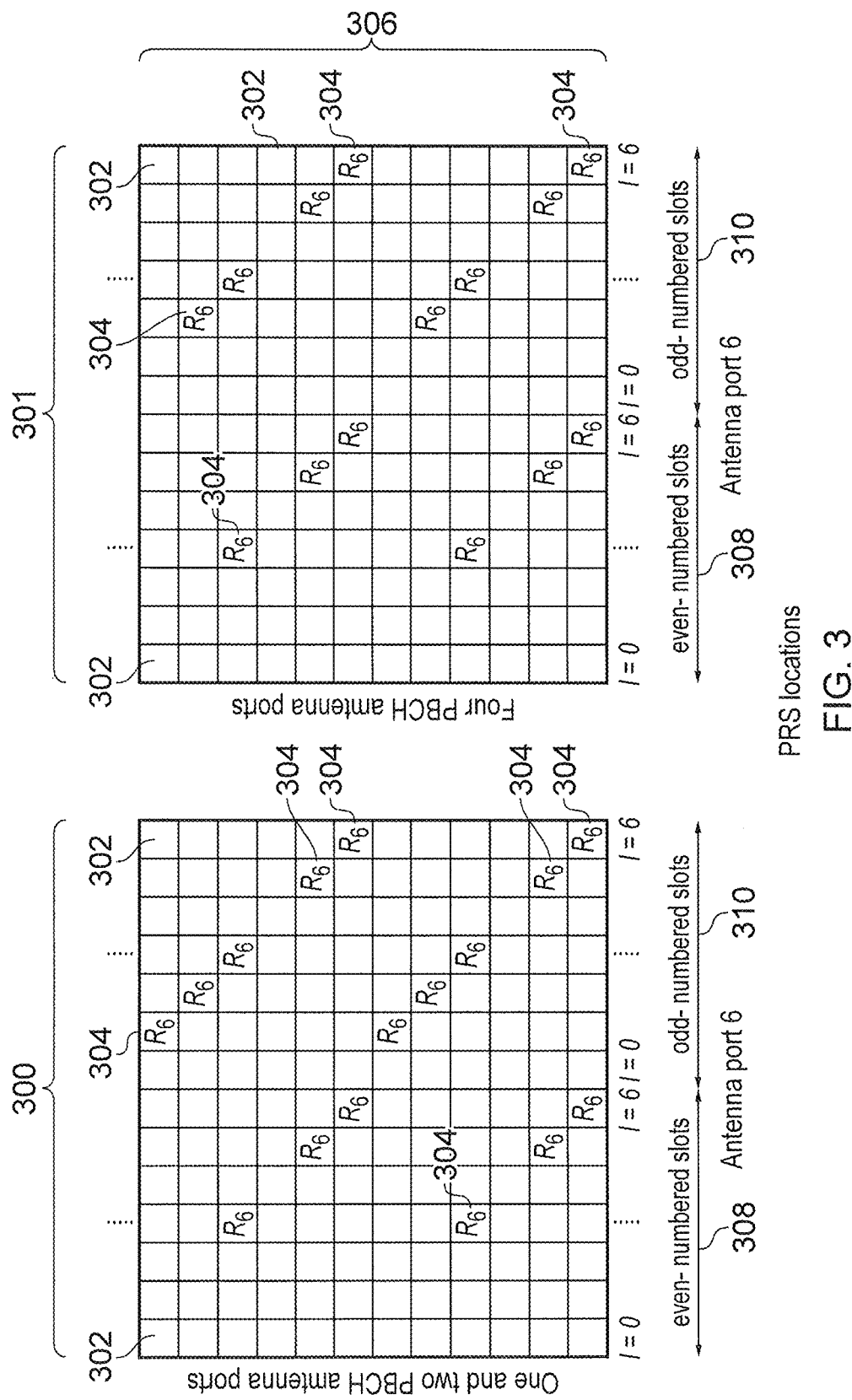
FIG. 3 provides an illustrative representation of a grid of resource elements of a wireless access interface, which include in a plurality of the resource elements positioning reference signals transmitted by a plurality of base stations.
Figure 4:
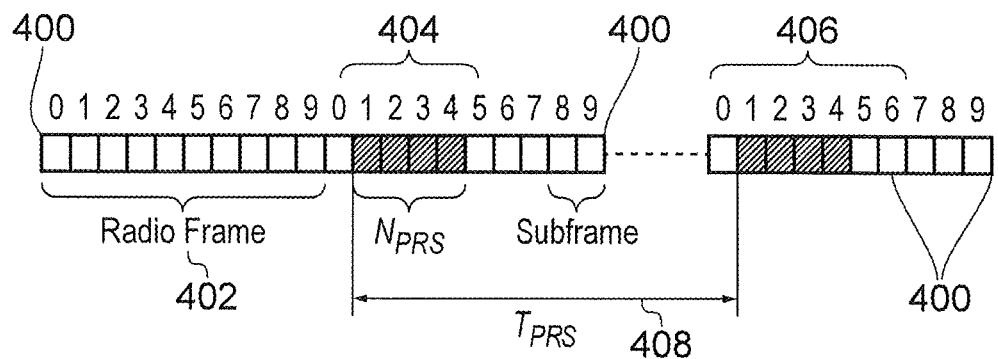
FIG. 4 is an illustrative representation of a pattern of positioning reference signals transmitted to provide a positioning occasion and positioning period.

The time of arrival can be estimated using a known signal. For the example of LTE, some signals are transmitted in accordance with a known format and in known time and frequency resources, such as for example CRS, PSS or SSS. However, these reference signals experience inter-cell interferences. For this reason in some examples Positioning Reference Signals (PRS) are introduced. FIG. 3 shows an illustration of two example LTE sub frames 300, 301 comprising time and frequency resources elements represented as boxes 302. Each of the sub frames includes odd and even times slots 308, 310, each comprising l=0 to 6 OFDM symbols comprising sub-carriers represented as vertical or y-axis line of the boxes 302. The resource elements 302 also include a set of positioning reference signals 304 for an eNodeB within a physical resource block 306 and the location occupied is dependent upon the eNodeB's Cell ID. Up to six different sets of positioning reference signal locations with different frequency shifts can be transmitted, hence up to six different eNodeBs can be measured at a time if assuming one eNodeB per frequency shift. This is because the eNodeBs sharing the same frequency shift would have different sequences to distinguish among themselves. The positioning reference signals are transmitted over $N_{PRS}=\{1, 2, 4, 6\}$ consecutive subframes with a period of $T_{PRS}=\{160, 320, 640, 1280\}$ subframes. The $N_{PRS}$ consecutive subframes of positioning reference signal transmission is known as the positioning occasion. An example of a positioning occasion and a positioning period $T_{PRS}$ are shown in FIG. 4. In FIG. 4, time divided units of a wireless access interface comprises sub-frames 400, which are formed into radio frames 402. Each radio frame 402 comprises ten sub-frames 400. Four of the sub-frames 404, 406 number 1 to 4 of the radio frame 402 separated by a positioning period comprising a number of sub-frames 408 separate each group of four sub-frames in which the positioning reference signals are transmitted. Therefore as shown in FIG. 4, the sub-frames 400 numbered 0 to 9 illustrate a positioning occasion with a length of $N_{PRS}=4$ subframes and occupy subframe 1, 2, 3 and 4.

Tracking devices such as child trackers, which are attached to a child for monitoring the child's location, typically require a quick update of a position of the communications device forming the child tracker. IoT devices are also expected to work out of a normal coverage area and so such tracking devices would require repetitions of the PRS in order to improve a likelihood that the PRS can be detected. For such communications device existing PRS resources may not be sufficient. For example if $T_{PRS}=1280$ subframes (i.e. 1.28 seconds) and $N_{PRS}=6$, for a device under coverage enhancement that requires 100 repetitions per PRS measurement, this would take 21 seconds for one measurement to take place. Furthermore a communications device may require several measurements to make a report. As will be appreciated therefore, it is desirable to reduce a time required to obtain a measurement of a RSTD without significant resource usage.

Improvements in Determining a Location of Communications Devices

Figure 5:
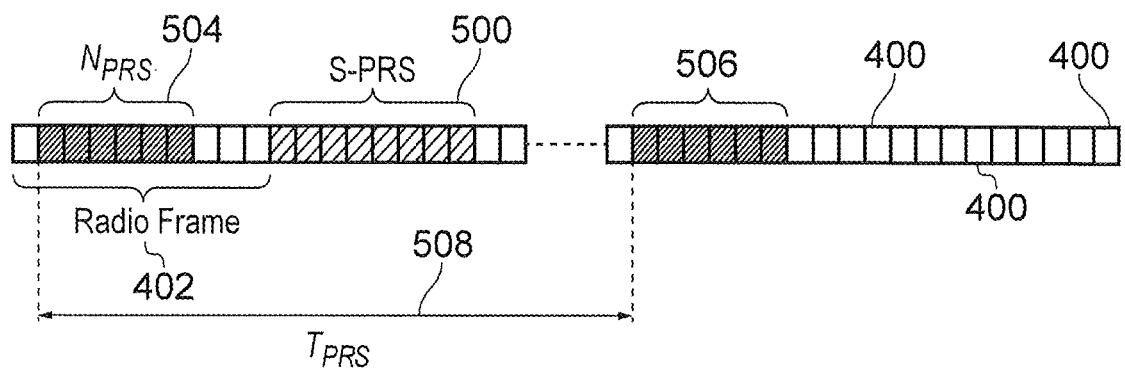
FIG. 5 is an illustrative representation of a pattern of positioning reference signals and supplementary positioning reference signals transmitted to provide additional positioning occasions and positioning periods according to the present technique.

Embodiments of the present technique can provide an arrangement in which supplementary positioning reference signals (PRS) (S-PRS) are provided by the network for a short duration of time and are targeted at one or more UEs (i.e. group of UEs), which are selected to receive the S-PRS. The S-PRS enable the network to transmit additional PRS when the need arises which can lead to efficient use of the resources as compared to broadcasting additional PRS to all UEs indiscriminately. That is, for a UE which requires additional PRS in order to measure the RSTD, the UE can use S-PRS in addition to the existing PRS. Once the UE has been able to perform the measurement, the S-PRS transmission can be disabled, although the existing PRS transmission continues). An example is shown in FIG. 5 where the existing PRS are broadcast every $T_{PRS}$ period 508 with a positioning occasion length $N_{PRS}=6$ subframes 504, 506. If a UE or a small group of UEs require additional PRS, the network can transmits the S-PRS where for the example shown in FIG. 5, S-PRS are transmitted in the next radio frame 502 for eight subframes 500 and not transmitted thereafter.

According to some example embodiments, the S-PRS are transmitted by one or more neighbouring eNodesBs and the neighbouring eNodeBs need not be the same as those in the existing broadcast based PRS. That is to say that the network can provide additional PRS in the form of S-PRS for a subset of eNodeBs, for example eNodeBs that are further away from the UE than other eNodeBs in the group. The S-PRS can also provide PRS from eNodeBs that are not in the broadcast based PRS for example to enhance the UE's measurement accuracy.

In an embodiment, the S-PRS is configured by the network using radio resource control (RRC) signalling. For example, this can be part of a measurement report configuration. The configuration indicates the frequency and time resources containing the S-PRS and the number of S-PRS sets, where each set corresponds to one or more eNodeBs. It should be appreciated that the resources used for S-PRS can be different to those used for the broadcast based PRS.

In another embodiment, the RRC configuration of the S-PRS further includes the start and stop time, for example a system frame number (SFN) of these S-PRS transmissions.

In another embodiment, the RRC configuration indicates the frequency and time resources of the S-PRS but further details of the S-PRS can be indicated using downlink control information (DCI). The "further details" may include:

The start of S-PRS and stop of S-PRS transmissions, for example the start subframe and stop subframe of the S-PRS transmissions.

The pattern of resource elements used to transmit the S-PRS, for example the first subcarrier used by the S-PRS. The following subcarriers can be mapped as a function of the first subcarrier, along the lines of the pattern shown in FIG. 3.

The number of resource elements used to transmit the S-PRS per eNodeB. For example for distant eNodeBs, more S-PRS may be applied to improve the reception accuracy of the S-PRS.

The mapping between resource elements used for S-PRS and the resource elements used for the standard PRS.

In a more general sense, the information that defines the S-PRS can be split between RRC signalling and DCI signalling.

In another embodiment, the S-PRS is scheduled by DCI for example carried by an NPDCCH or M-PDCCH. The DCI can include the duration of the S-PRS transmission, for example the number of repetitions. This can be used in cases where the UE moves at a higher speed and requires additional PRS to provide a faster update of its location and hence a dynamic scheduling of S-PRS via a DCI is therefore beneficial.

In another embodiment, a group identifier can be configured for a group of UEs. The NPDCCH/M-PDCCH containing the DCI for S-PRS would use this group identifier to mask its cyclic redundancy check CRC so that only UEs within the configured group need to read the contents of this DCI and are scheduled with the S-PRS.

In another embodiment, the UE can request for S-PRS from the network. This recognises that the UE is in the best position to decide whether it requires additional PRS to meet a required performance, for example to reach a certain accuracy or to obtain RSTD measurements within a defined period of time. The request can be sent using an uplink control information message (UCI) at the physical layer or a RRC request. In some embodiments the UE can estimate the accuracy of its RSTD measurement by comparing the difference in magnitude of an estimated power delay profile (PDP) taps to a threshold. If the power delay profile taps do not exceed the threshold then the UE can communicate a request for S-PRS to the eNodeB for which the power delay profile was estimated. In other examples, the UE can transmit a request indicating the eNodeBs for which it requires S-PRS. This is beneficial when the UE can estimate the accuracy of the RSTD measurement from each eNodeB (or group of eNodeBs). In this case, the UE only needs to receive S-PRS from those eNodeBs for which it does not have accurate RSTD measurements.

In another embodiment, the UE reports RSTD measurements only for those eNodeBs for which it has accurate RSTD measurements. If a location server receives measurement reports with missing RSTD measurements, the location server or the network generally can realise that the UE has not been able to accurately determine an RSTD measurement for certain eNodeBs and schedules S-PRS for those eNodeBs.

In another embodiment, the UE reports RSTD measurements and estimates of the quality of the RSTD measurements. When the location server receives measurement reports with RSTD measurements of low quality, such that it cannot accurately determine UE location, it schedules S-PRS for those eNodeBs associated with low-accuracy RSTD measurements.

In an embodiment, an eNodeB that requires a positioning report using S-PRS signals to other eNodeBs over a backhaul interface that those other eNodeBs need to transmit S-PRS and the characteristics of those S-PRS.

In another embodiment, a location server or other entity at a higher level of hierarchy than the eNodeB or generally forming part of the wireless communications network indicates to a set of eNodeBs that they are required to transmit S-PRS signals in a co-ordinated manner to UEs.

Efficient Use of Positioning Reference Signals to Determine a UE's Location

Figure 6:
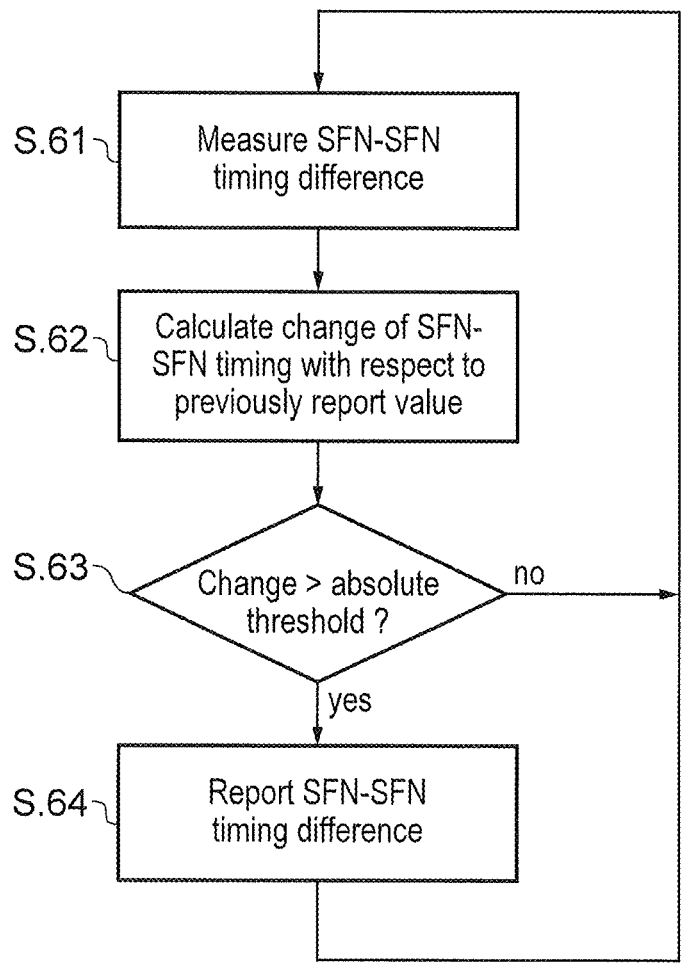
FIG. 6 is a flow diagram illustrating a process of conditionally reporting a timing difference between system frame numbers received from a plurality of base stations by a communications device according to a previously proposed arrangement.

As will be appreciated from the above explanation, a location of a UE can be determined from reports of observed time difference of received positioning reference signals. According to this arrangement a receiver of the UE is configured to receive positioning reference signals from one or more of the infrastructure equipment. A controller of the UE in combination with the receiver determines an observed time difference between a reception of the positioning reference signals transmitted by the plurality of infrastructure equipment, and transmits an indication of the observed time difference of the received positioning reference signals to the wireless communications network for determining a location of the communications device with respect to a location of the plurality of infrastructure equipment. A known procedure performed with the UEs configured to operate in accordance with a Universal Mobile Telecommunications System (UMTS) is illustrated by the flow diagram shown in FIG. 6. In this example a UE is configured to report measurements based on a received system frame number (SFN). In a first step S.61, a UE compares a time of receiving the same system frame number (SFN) and measures a time difference between receiving the same SFN from two or more different base stations (NodeBs). In step S.62 the UE calculates a change in the time difference of receiving the same SFN from the two or more base stations. At decision point S.63 the UE determines whether the change in time difference exceeds an absolute threshold, and if it has then the process proceeds to step S.64 in which the UE proceeds to report the measured difference in the time of receipt of the same SFN from different base stations to the wireless communications network, which can be used by for example a location server to determine a location of the UE. If at decision point S.63 the change in time difference does not exceed the absolute threshold then the process proceeds back to step S.61.

Other example reporting events as proposed in the UMTS system, which can trigger a UE to report a change in its location include:

The UE position changes more than an absolute threshold;
Reporting Event 7b: SFN-SFN measurement changes more than an absolute threshold;
GPS time and SFN time have drifted apart more than an absolute threshold;
GANSS time and SFN time have drifted apart more than an absolute threshold.

Figure 7:
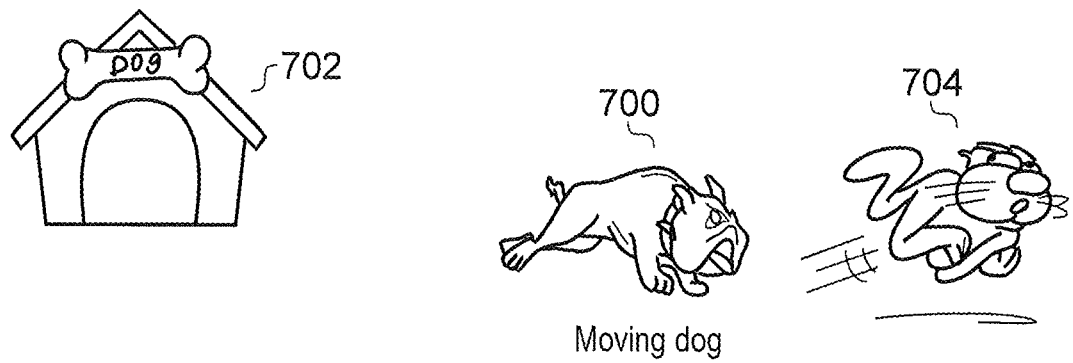
FIG. 7 is an illustrative representation showing a stationary and a moving dog as an example application of tracking an object.
Figure 7:

There are applications where the item is tracked by attaching a communications device (UE) to the item. For some applications, for example a dog tracker, the item is often stationary and the location of the device is only required when the item moves. For example, and referring to FIG. 7, a dog 700 that is sleeping next to its kennel 702 is stationary and the location of the dog is only of interest to the owner when the dog 700 has moved away from its kennel 702 as is self-evident from FIG. 7 when the dog 700 chases a cat 704.

An aspect where technical improvements are desirable is to improve a UE's battery life. As such, providing some technique for improving energy efficiency can help to conserve power and therefore increase a time between replacing a UE's batteries or between charging a UE's batteries. In the background methods of location determination such as those deployed for UMTS, the UE performs positioning-related measurements when instructed by the network (eNodeB or location server). Each time the UE is instructed to perform a positioning measurement, it must perform multiple operations:

Make RSTD measurements on multiple eNodeBs
Report RSTD measurements using an uplink channel, such as PUSCH Both the acts of performing RSTD measurements and of reporting the RSTD measurements consume power. A method of reducing a number of measurement reports from the UE and/or reducing the number of measurements performed by the UE would thus be beneficial from the perspective of preserving UE battery life.

Embodiments of the present technique can therefore provide an arrangement in which a UE performs positioning measurement reports only when a triggering event is reached. Example triggers include:

The RSRP of the serving cell changes by more than a threshold amount;
The RSTD measurement of two (or more) reference cells (e.g. serving cell and nearest neighbour) changes by more than a threshold amount;
The measured power delay profile (PDP) measured at the UE changes by more than a certain amount;
The UE selects a different cell;
The location of the UE is known to have moved from an external stimulus. For example, a tracked item (e.g. dog) keeps contact with a Bluetooth beacon via a Bluetooth signal (e.g. transmitted from a Bluetooth beacon attached to the dog kennel): if the dog tracker can no longer hear the Bluetooth beacon signal, positioning measurement reports are triggered.

The inventors have observed that the above triggering measurements entail less power consumption than performing the positioning measurements themselves. Hence when positioning measurements are only performed if a trigger is activated, the UE can save on battery resources.

In the following description the following terms should be interpreted to have the meaning present in the table below:

| Terminology | Meaning |
| --- | --- |
| Positioning measurement | A set of measurements used to determine the geographic location of the UE (e.g. a set of RSTD measurements on a set of reference eNodeBs) |
| Triggering measurement | A measurement that is performed that can trigger the UE to perform a full positioning measurement |
| Location report | A geographical location (e.g. latitude and longitude) that is signalled from the network to the UE |

Mechanisms of Triggering Positioning Measurement Reports

Figure 8:
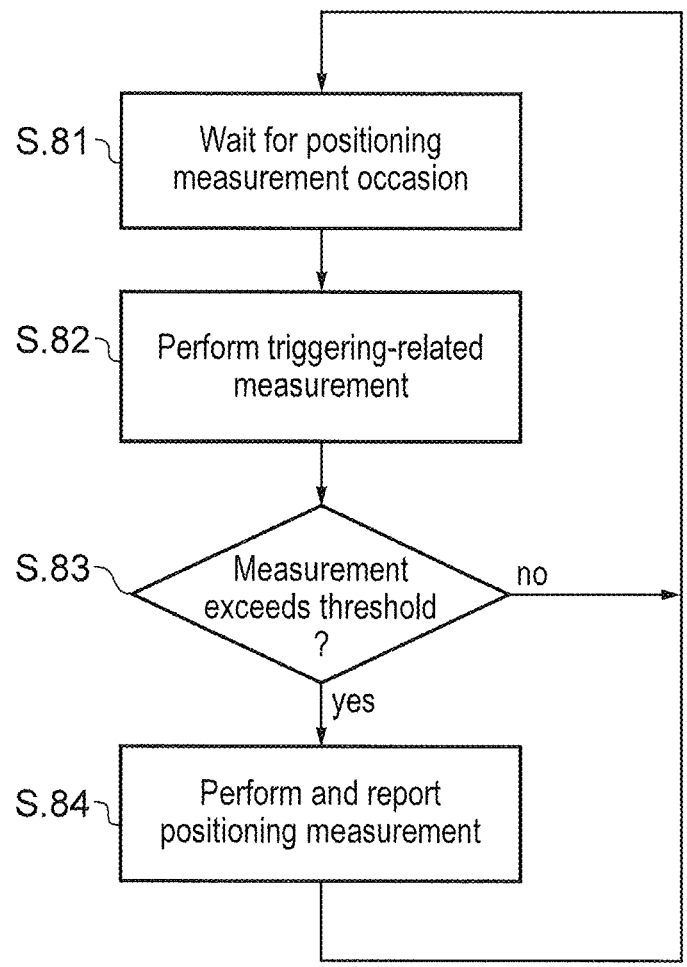
FIG. 8 is a flow diagram illustrating a process of performing and reporting observed time difference measurements according to the present technique.

FIG. 8 shows a flow chart that allows a UE to determine whether it should perform and report positioning measurements according to an example embodiment. In the flow chart of FIG. 8, the UE waits for a positioning measurement occasion in step S.81. At the positioning measurement occasion, the UE performs a triggering-related measurement in step S.82. For example the UE measures the reference signal received power (RSRP) of reference signals received from the eNodeB on its serving cell. At decision point S.83, if the triggering-related measurement exceeds a threshold, for example the measured RSRP has changed by more than a certain amount, then in step S.84 the UE performs and reports a positioning measurement. For example, the UE measures the RSTD on multiple eNodeBs and sends an uplink message reporting those measurements. If not, then the UE waits for the next positioning measurement occasion in step S.81. However, this waiting operation can be performed in a low power state, according to UE implementation.

According to the present technique, a UE can be configured to perform trigger-based positioning measurements. If the UE is not configured to perform trigger-based positioning measurements, it can perform on-demand or periodic positioning measurements, as for a conventional arrangement.

In another embodiment, the UE only reports RSTD positioning measurements if they have been triggered and does not report anything for the case that no RSTD measurements have been triggered.

In another embodiment, at measurement occasions, the UE reports either:

A "no change" indication to the network if the triggering measurement does not result in the UE performing RSTD measurements; or
RSTD measurements if they have been triggered According to this example an advantage is provided because the network knows what type of measurement the UE has performed. For this example embodiment, if there is no report from the UE, the network can request the UE to re-transmit the report.

Figure 9:
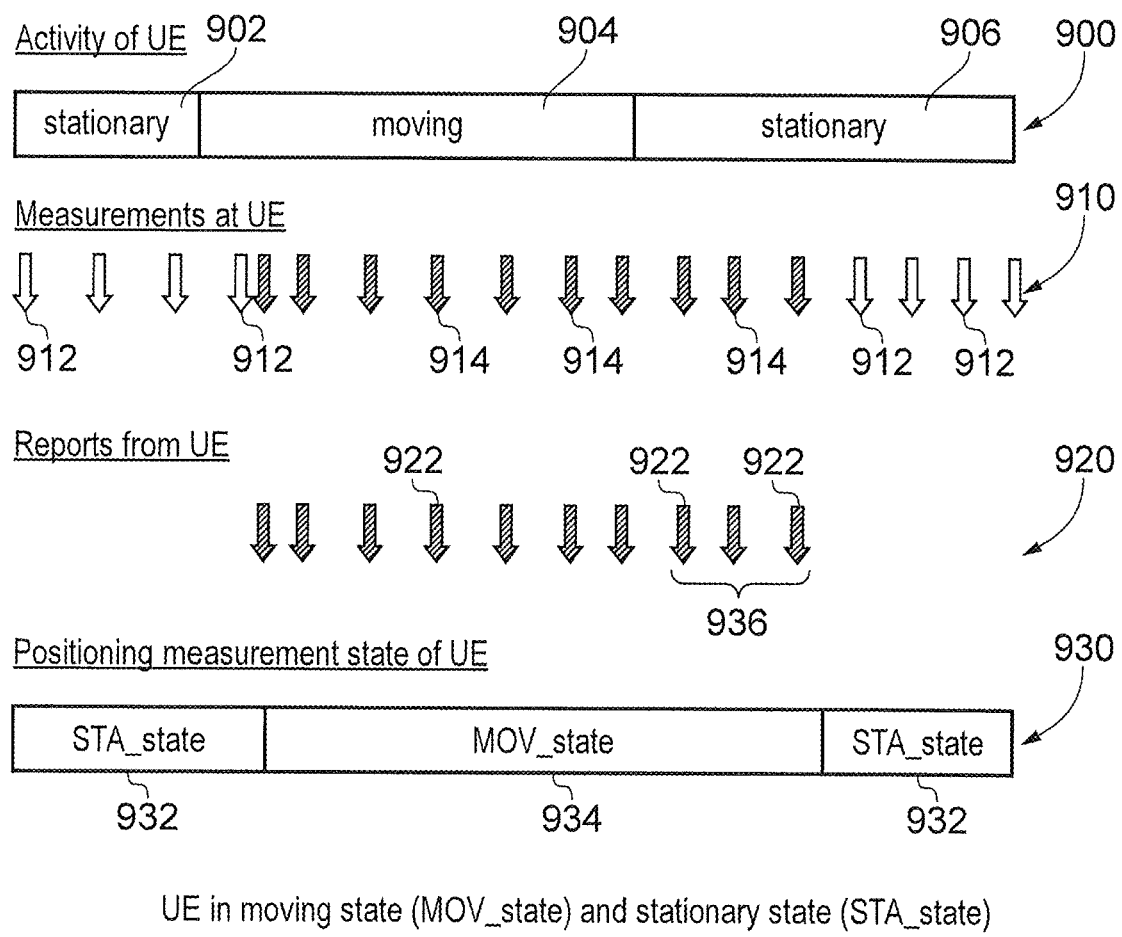
FIG. 9 is an illustrative representation of a process in which a communications device determines whether the device is either in a stationary state or a moving state and for each of the stationary state and the moving state adapts one or both of measuring observed time differences of receiving positioning reference signals or transmitting the measured observed time differences to the wireless communications network.

In some example embodiments, the UE is determined to be either in a moving state (MOV_state) or in a stationary state (STA_state) as illustrated in FIG. 9. In FIG. 9 a first row of boxes 900 represents an indication of a relative movement of a UE, which changes from stationary 902 to moving 904 back to stationary 906. In a second row 910 arrows 912, 914 represent measurement activity of the UE. The white or unfilled arrows 912 represent measurements performed when the UE is in a stationary state (STA_state), whereas the black or filled arrows 914 represent measurements performed when the UE is in a moving state (MOV_state). A third row 920 shows arrows 922 representing occasions when the UE reports measurements to the network. A fourth row of boxes represents a determined positioning measurement state of the UE, which is either determined to be stationary STA_state or in a moving state MOV_state 932, 934.

As illustrated in FIG. 9, if positioning reports indicate that the UE's location is changing, it is considered to be in a moving state 934. If the positioning measurement reports indicate that the UE's location is not changing, it is considered to be in a stationary state 932. UEs that are determined to be in a moving state 934 send positioning measurement reports 922, but UEs in a stationary state only send positioning measurements if those measurements are triggered by some other event or measurement, for example by RSRP measurements. The UE may be deemed to have entered the moving state 934 if a location report such as a message from the network informing the UE of its geographic location, indicates that the UE has moved. The UE may be deemed to have entered the stationary state 934 if a number of consecutive location reports 922 indicate that it has not moved. There can be hysteresis between the UE being in the moving state 934 and it being in the stationary state 932.

As will be appreciated from the above explanation FIG. 9 shows the following:

The UE is initially stationary and in the STA_state 932.

In the STA_state, the UE makes triggering measurements (shown with an unfilled arrow 912), but since these triggering measurements show no change in location, positioning reports are not triggered.

The fourth triggering measurement in the STA_state indicates movement from the UE (by this time the UE is moving). The UE then performs and reports positioning measurements (indicated by the first shaded arrow 922).

The positioning report causes the network to determine that the UE has changed location. The new location report sent to the UE causes the UE to transfer to the MOV_state 934.

In the MOV_state, the UE performs and reports positioning measurements 922. It receives location reports from the network.

The UE stops moving, but still continues measuring and sending positioning measurements, since it is still in the MOV_state 934.

The last three shaded positioning measurement reports 936 lead to UE location reports that indicate that the UE location has not changed. Hence the UE transfers to STA_state 932.

In the STA state, the UE performs triggering measurements and only sends positioning measurements if these are triggered.

In other embodiments, the UE switches from trigger based positioning measurements to periodic based positioning measurements, if the rate of change of the trigger event (e.g. changes to RSRP) is higher than a threshold. This puts an upper limit to the rate of positioning reports required of the UE and thereby conserves battery power.

In other embodiments, the UE switches from trigger based positioning measurements to periodic based positioning measurements, if the rate of the trigger events, for example the rate at which RSRP measurements trigger positioning measurements, is higher than a threshold. This puts an upper limit to the rate of positioning reports required of the UE and thereby conserves battery power.

Performing Multiple Triggering Measurements

Figure 10:
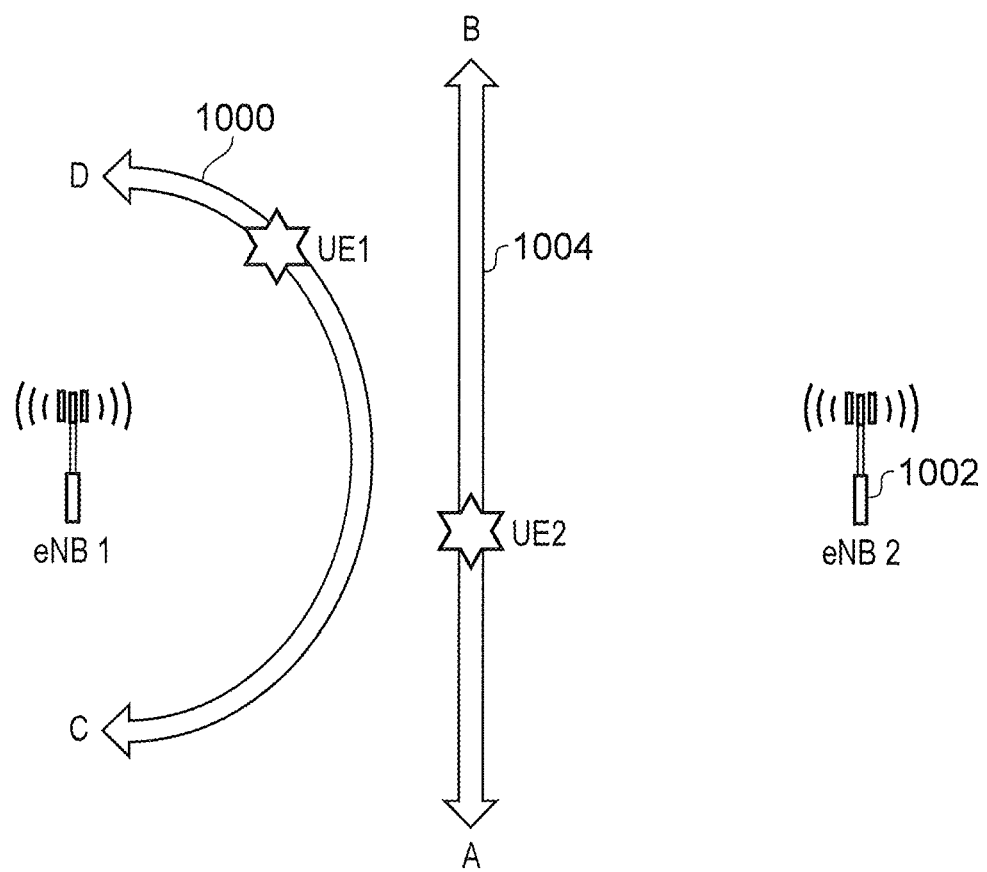
FIG. 10 is an illustrative representation of an effect on a path of movement of a communications device and an effect of different paths on a process for determining whether to determine the observed time difference measurements or to transmit determined observed time differences.

FIG. 10 illustrates an example in which the influence of different movement paths of a UE can affect both measuring observed time differences between positioning reference signals received from different eNodeBs eNB1, eNB2 and the reporting of those measurements. As shown in FIG. 10 a first UE, UE1 moves along an arc 1000 with respect to a position of the eNodeBs eNB1, eNB2 1001, 1002, whereas a second example UE2 moves along a straight path 1004. These two different movement paths 1000, 1004 between the two eNodeBs eB1, eNB2 can have different impacts on the triggering measurements:

UE1 moves in the arc 1000 of a circle around the first eNodeB eNB1 from C to D. For this UE, the RSRP from the serving cell eNB1 is constant and motion along this arc of the circle 1000 cannot be determined using these measurements. For this UE1, the following measurements would indicate movement:

RSTD (between eNB1 and eNB2): the distance of the UE from eNB1 is constant, but varies relative to eNB2.

RSRP to neighbour cell eNB2: the path loss from eNB2 varies along the arc C-D.

UE2 moves in a straight line 1004 A to B, perpendicular and equidistant from eNB1 and eNB2 1001, 1002. The RSTD measurement does not change along this line, but the RSRP measurements to the serving eNodeB and neighbour eNodeB do change.

Based on the observations above, related to FIG. 10, it has been realised that it is advantageous for the UE to be able to perform more than one type of triggering measurement, leading to the following examples:

The triggering measurement type cycles in time. For example, in a first measurement occasion, the UE performs an RSRP measurement of the serving cell, in a second measurement occasion, the UE performs an RSRP measurement of a neighbour cell and in a third measurement occasion, the UE performs an RSTD measurement on two reference cells. If any of these triggering measurements trigger a full set of RSTD measurements, the UE performs and reports those RSTD measurements.

Triggering measurements can be combined. For example, the UE performs a positioning report when either the serving cell RSRP changes or a single RSTD measurement changes.

The trigger event is a change in RSTD between any of the neighbouring cells that are monitored. For example, the UE is configured to monitor RSTD for six neighbouring eNodeBs. During the triggering phase, the UE monitors the RSTD between pairs of these neighbouring eNodeBs (and the serving eNodeB). The UE can cycle these measurements in time, or perform a subset of the RSTD measurements for any one triggering measurement. If any of the selected neighbouring eNodeBs' RSTD changes by a threshold, a full positioning measurement on the configured set of eNodeBs in performed and reported by the UE. It should be appreciated that the threshold can be different for different neighbouring eNBs.

Rsrp-Based Triggering Measurements

According to example embodiments, the UE performs RSTD positioning measurements if the measured RSRP changes by more than a threshold amount (the threshold can be signalled to the UE by SIB or RRC signalling). The UE may measure the RSRP at various times, according to implementation and/or configuration. For example, the UE may measure RSRP under one or more of the following circumstances:

Performs RSRP measurements for cell selection purposes.

Performs RSRP measurements every positioning measurement occasion. If this RSRP measurement has changed by more than a threshold amount, the UE performs the full set of RSTD measurements.

Performs RSRP measurements on paging occasions.

Performs RSRP measurements prior to sending mobile-originated UL data.

The RSRP that triggers the UE to perform the RSTD measurement can be measured on the serving cell or on one or more neighbour cells. If the RSRP changes by more than a threshold amount relative to any of these cells, it is an indication that the UE has moved and should perform RSTD measurements.

Figure 11:
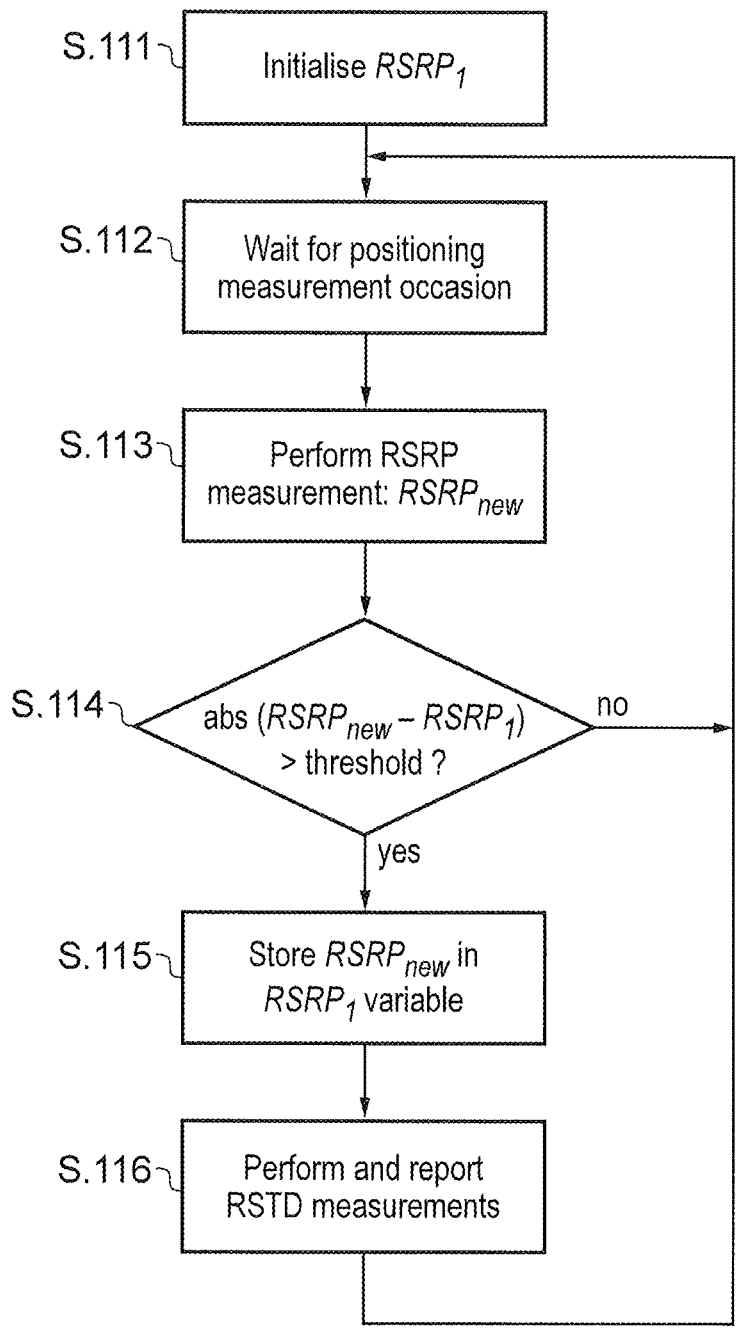
FIG. 11 is a flow diagram illustrating a process of performing and reporting observed time difference measurements depending upon movement of a communications device determined from reference signal received signal strength measurements according to the present technique.

In the above example, RSTD measurements are triggered if the change in a measurement exceeds a threshold. In some embodiments, the change is relative to the measurement that was taken when the previous RSTD measurement was performed. For example, if the trigger is based on RSRP measurements, when the UE performs an RSTD measurement, it also performs an RSRP measurement and stores that RSRP measurement (as $RSRP_1$). The UE then performs further RSRP measurements ($RSRP_{new}$). If abs ($RSRP_{new}$–$RSRP_1$)>threshold, then the UE performs new RSTD measurements and updates the $RSRP_1$ value with the newly measured RSRP measurement, $RSRP_{new}$. An illustration of this example embodiment is shown in FIG. 11. FIG. 11 is summarised as follows:

S.111: An initial RSRP value is generated, such as a default or reset value or the initial $RSRP_1$ value may be the RSRP value measured by the UE when the UE is initially configured to report positioning measurements.

S.112: As for the example shown in FIG. 8 (step S.81) the UE waits for a measurement occasion.

S.113: At the measurement occasion the UE performs a measurement of the RSRP from one of the eNodeBs from which it can receive positioning reference signals. The RSRP value determined then becomes the new RSRP value ($RSRP_{new}$).

S.114: At decision point S.114, the UE determines whether the absolute difference between the new RSRP value and the old one exceeds a threshold (abs ($RSRP_{new}$–$RSRP_1$)>threshold). If it does not then processing proceeds back to step S.112 and the UE waits for a positioning measurement occasion.

S.115: If at decision point S.114, the absolute difference between the new RSRP value and the old RSRP value does exceed the threshold then the new RSRP value is stored as the initial RSRP value.

S.116: The UE then proceeds to perform and to report the RSTD values to the wireless access network.

Power Delay Profile Based Triggering Measurements

Figure 12:
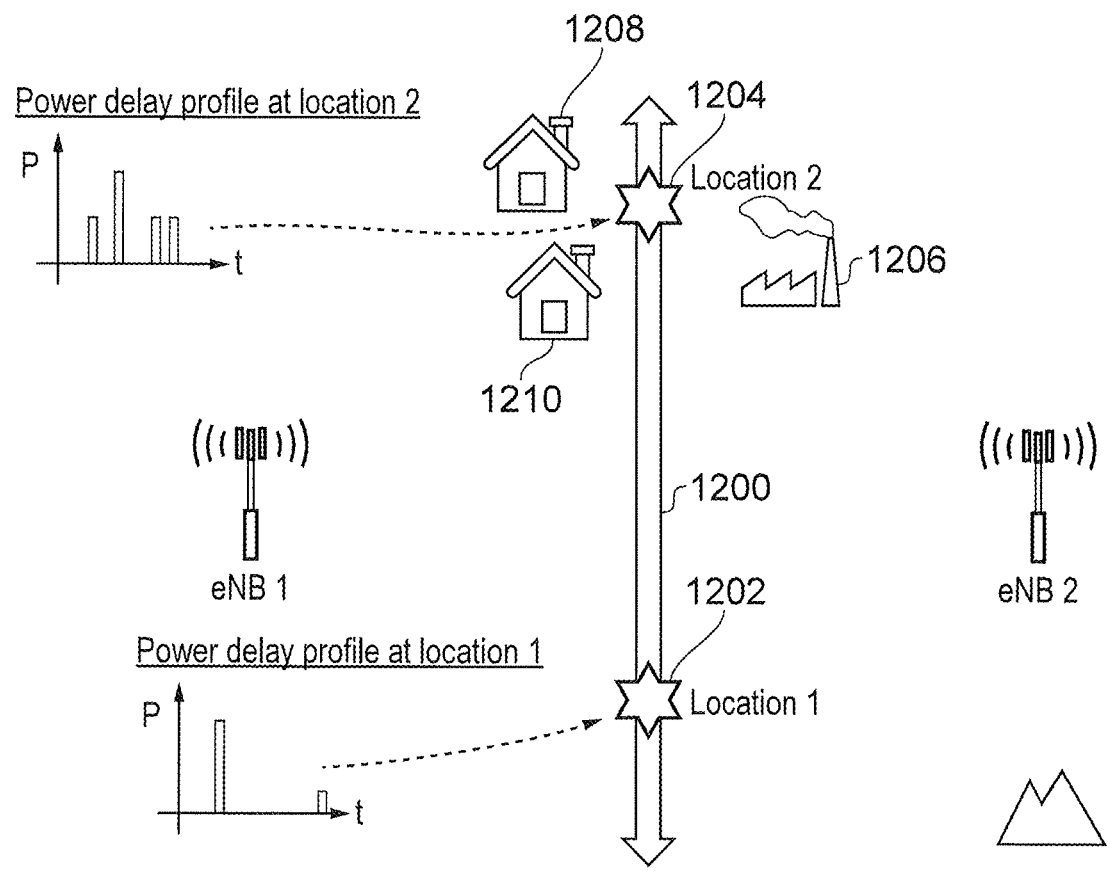
FIG. 12 is an illustrative representation of a difference in a power delay profile of signals received at different locations to trigger a process for determining observed time difference measurements or to transmit determined observed time differences.

In another example embodiment the triggering measurements can be based on power delay profiles measured by the UE. If these power delay profiles change significantly, the UE performs and reports positioning measurements. FIG. 12 shows an example situation where the RSTD measurement in two locations is the same, but the power delay profiles in the locations are different. As shown in FIG. 12 a UE moves along a straight path 1200, between two eNodeBs eNB1, eNB2. At two different measurement occasions 1202, 1204 the UE measures a power delay profile of signals received from the eNodeBs eNB1, eNB2. The power delaye profiles may differ, for example due to the presence of different surroundings such as buildings 1206, 1208, 1210 causing different multi-path profiles. The RSTD measurements in location 1 and location 2 1202, 1204 may be the same, because locations 1 and 2 lie on the line 1200 that is perpendicular and equidistant from eNB1 and eNB2. However as a result of increased multi-path reception caused by the buildings 1204, 1208, 1210 producing multiple reflections of the received signal around location 2 in the propagation environment many multi-path components in the power delay profile are produced. In location 1, there is a single dominant line of sight path in the power delay profile with a single much-delayed component from a distant mountain. The UE is able to determine that the power delay profile has changed significantly between locations 1 and 2, triggering a positioning measurement report.

Network Triggering of Positioning Measurement Reports

According to another embodiment, the network can monitor a round trip time to the UE, for example by monitoring of PRACH transmissions from the UE. If the round trip time has changed by more than a threshold amount, the network triggers the UE to perform a measurement report, for example by sending an RRC message to the UE.

The above embodiments have focused on the UE being triggered to perform RSTD measurements, based on some triggering mechanism. This form of operation is particularly applicable to downlink-centric positioning methods (such as OTDOA). It will be evident to a skilled artisan that uplink transmissions related to uplink-centric positioning methods (such as UTDOA) can also be triggered by measurements performed by the UE according to the embodiments described above.

Reporting Triggering Measurements and Positioning Measurements

Figure 13:
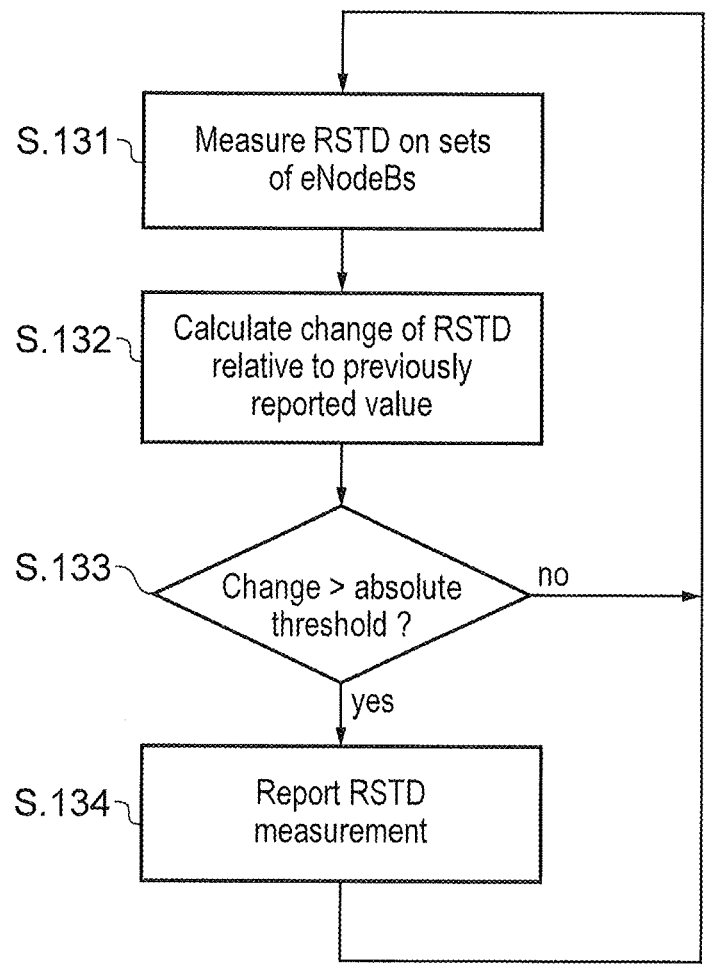
FIG. 13 is a flow diagram illustrating a process of performing and reporting observed time difference measurements depending upon movement of a communications device determined from received signal time differences of positioning reference signals received from a set of base stations according to the present technique.

According to some embodiments, the UE reports the triggering measurements themselves to the eNodeB. The UE may also at a future time report further positioning measurements to the eNodeB. For example, the triggering measurement may be an RSTD measurement performed on one or more sets of eNodeBs. If this triggering measurement has changed, from a previously reported RSTD measurement, by greater than an absolute threshold, the UE reports this RSTD measurement to the eNodeB. This example is shown in the flow diagram of FIG. 13, which is summarized as follows:

S.131: In a first step the UE measures the RSTD for positioning reference signals received from different eNodeBs in a set of eNodeBs, which include a plurality of neighbouring eNodeBs as well as an eNodeB to which the UE is currently attached for transmitting and receiving data.

S.132: The UE then calculates a change of RSTD relative to a previously reported RSTD value.

S.133: At a decision step, the UE determines whether the change in the RSTD has exceeded a threshold value, which may be predefined.

S.134: If the change has exceeded the threshold then the UE proceeds to report the measured RSTD. However if the change in the RSTD value has not exceeded the threshold then the process returns to step S.131.

Figure 14:
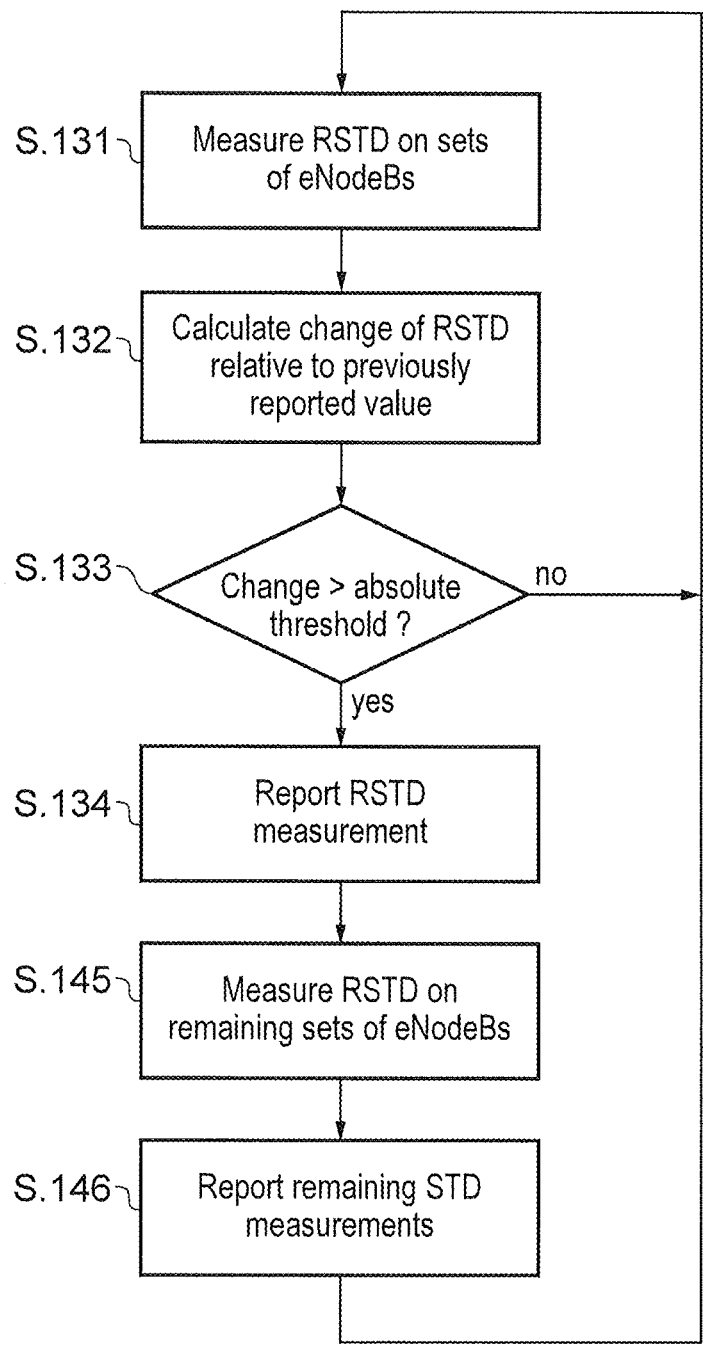
FIG. 14 is a flow diagram illustrating a process of performing and reporting observed time difference measurements depending upon movement of a communications device determined from received signal time differences of positioning reference signals transmitted from a sub-set of a set of base stations, followed by measuring and reporting received signal time differences for remaining base stations of the set to derive a more accurate positon estimate according to the present technique.

FIG. 14 shows a more complicated example where the UE performs RSTD measurements on a limited set of eNodeB as triggering measurements. If the change in one of those triggering measurements exceeds a threshold, the UE immediately reports the RSTD measurements that cause the trigger. This part of the process shown in FIG. 14 corresponds to the example presented in FIG. 13 and accordingly steps S.131. S.132, S.133 and S.134 bear the same alpha-numeric references. The UE then proceeds at step S. 145 to perform RSTD measurements on other sets of eNodeBs, in order to create a full set of positioning measurements and in step S.146 reports these to the network at a future time. It can be advantageous for the network to receive an early positioning measurement report according to this example because:

The network can alert a user at the earliest opportunity that the tracked device has moved.

The network can derive an initial estimate of the new device location.

This location can be refined when the full positioning measurement report is subsequently received from the UE.

It will be apparent to a skilled artisan that in the flow chart of FIG. 14, the triggering measurement and the positioning measurement can be of different types. For example, the triggering measurement S.131, S.132 in FIG. 14 can be an RSRP measurement and the positioning measurement S.134 can be a set of RSTD measurements. The early reporting of the RSRP measurement S.134 can help to provide an initial estimate of how the UE location has changed at an early stage, for example whether the UE has moved towards or away from a serving eNodeB.

Various further aspects and features of the present invention are defined in the following numbered paragraphs:

Paragraph 1. A location server configured to cooperate with infrastructure equipment of a wireless communications network, the infrastructure equipment being configured to transmit signals to and receive signals from communications devices via a wireless access interface to transmit data to and to receive data from the communication devices, the wireless access interface being divided into a plurality of time units each providing time and frequency resources for transmitting the signals and receiving the signals and a plurality of the time divided units include positioning reference signals which are transmitted by the infrastructure equipment, the location server comprising
a controller configured to determine a location of the communications devices with respect to a location of the infrastructure equipment from observed time differences between receiving the positioning reference signals transmitted by a plurality of the infrastructure equipment, and
a connecting interface with the wireless communications network configured to receive reports of the observed time differences from the communications devices and to transmit control information to the plurality of the infrastructure equipment, and the controller is configured
to transmit control information to the plurality of infrastructure equipment via the connecting interface to cause the plurality of infrastructure equipment to transmit supplementary positioning reference signals to one or more of the communications devices which are selected by the location server to assist the location server in determining the location of the selected one or more communications devices.

Paragraph 2. A location server as set out in paragraph 1, wherein the observed time difference reports received from the selected one or more communications devices include the observed time difference reports generated from receiving the positioning reference signals and observed time difference reports generated from receiving the supplementary positioning reference signals and controller is configured to combine the observed time difference reports generated from receiving the positioning reference signals and generated from the supplementary reference signals which reports are received from the selected one or more communications devices to form a more accurate estimate of the location of the selected one or more communications devices.

Paragraph 3. A location server as set out in paragraph 1, wherein the observed time difference reports received from the selected one or more communications devices are generated by the selected one or more communications devices from receiving the positioning reference signals and receiving the supplementary positioning reference signals to generate more accurate measurements for generating the observed time difference reports, from which the location server can form a more accurate estimate of the location of the selected one or more communications devices.

Paragraph 4. A location server as set out in paragraph 1, 2 or 3, wherein the controller is configured to determine whether predetermined conditions have been satisfied for causing the supplementary positioning reference signals to be transmitted by the plurality of infrastructure equipment so that the more accurate estimate of the location of the selected one or more communications devices can be generated.

Paragraph 5. A location server as set out in any of paragraphs 1 to 4, wherein the controller is configured to transmit the control information to the plurality of infrastructure equipment via the connecting interface to cause the plurality of infrastructure equipment to transmit supplementary positioning reference signals to the selected one or more communications devices for a predetermined time.

Paragraph 6. A location server as set out in any of paragraphs 1 to 5, wherein the controller is configured to transmit the control information to the plurality of infrastructure equipment via the connecting interface to cause the plurality of infrastructure equipment to transmit supplementary positioning reference signals to the selected one or more communications devices for a number of time units of the wireless access interface.

Paragraph 7. A location server as set out in paragraph 6, wherein the number of time units for which the supplementary positioning reference signals are transmitted is determined in accordance with a requirement for improving an accuracy of a location of the selected one or more communications devices.

Paragraph 8. A location server as set out in any of paragraphs 4 to 7, wherein the predetermined conditions for transmitting the supplementary positioning reference signals to the selected one or more communications devices includes receiving a request from the one or more communications devices.

Paragraph 9. A location server as set out in any of paragraphs 1 to 8, wherein the supplementary positioning reference signals are transmitted differently by each of the infrastructure equipment in the plurality of infrastructure equipment or the supplementary reference signals are only transmitted by one of the infrastructure equipment in the plurality of infrastructure equipment.

Paragraph 10. A location server as set out in any of paragraphs 1 to 9, wherein an indication of the time units and time and frequency resources in the time units in which the supplementary positioning reference signals are transmitted is communicated to the selected one or more communications devices using radio resource control signalling.

Paragraph 11. A location server as set out in paragraph 10, wherein the indication of the time units and the time and frequency resources in which the supplementary positioning reference signals are transmitted is communicated to the one or more selected communications devices using radio resource control signalling in combination with a downlink control information message.

Paragraph 12. A location server as set out in any of paragraphs 1 to 11, wherein the predetermined conditions for transmitting the supplementary positioning reference signals to the selected one or more communications devices includes detecting a requirement for a greater location accuracy for the selected one or more communications devices.

Paragraph 13. A location server as set out in paragraph 12, wherein the controller is configured to detect the requirement for a greater location accuracy for the selected one or more communications devices in response to detecting that an accuracy of observed time differences reports transmitted by the communications device does not satisfy a predetermined accuracy requirement.

Paragraph 14. An infrastructure equipment for transmitting data to or receiving data from communications devices in a wireless communications network, the infrastructure equipment comprising:

a transmitter configured to transmit signals to the communications devices via a wireless access interface, a receiver configured to receive signals from one or more of the communications devices via the wireless access interface, and a controller configured to control the transmitter and the receiver to transmit the signals and to receive the signals via the wireless access interface, the wireless access interface being divided into a plurality of time units each providing time and frequency resources for transmitting the signals and receiving the signals and a plurality of the time divided units include positioning reference signals which are transmitted by the transmitter in accordance with a predetermined pattern for location of the communications devices to be determined from an observed time difference between receiving the positioning reference signals transmitted by the infrastructure equipment and the positioning reference signals transmitted by one or more other infrastructure equipment at the communications devices, and the controller in combination with the transmitter is configured to transmit supplementary positioning reference signals to one or more communications devices which are selected to assist in determining the location of the selected one or more communications devices.

Paragraph 15. An infrastructure equipment as set out in paragraph 14, wherein the controller is configured with the transmitter to transmit the supplementary positioning reference signals with at least one other infrastructure equipment so that the location of the selected one or more communications devices can be determined from receiving the supplementary positioning reference signals if predetermined conditions have been satisfied for determining the location of the selected one or more communications devices.

Paragraph 16. An infrastructure equipment as set out in paragraph 14 or 15, wherein the controller is configured in combination with the transmitter to transmit the supplementary positioning reference signals to the one or more selected communications devices for a predetermined time.

Paragraph 17. An infrastructure equipment as set out in paragraph 16, wherein the predetermined time is represented as a number of time units.

Paragraph 18. An infrastructure equipment as set out in paragraph 17, wherein the number of time units for which the supplementary positioning reference signals are transmitted is determined in accordance with a requirement for improving an accuracy of a location of the selected one or more communications devices.

Paragraph 19. An infrastructure equipment as set out in any of paragraphs 14 to 18, wherein the predetermined conditions for transmitting the positioning reference signals to the one or more communications devices includes the receiver receiving a request from the one or more communications devices.

Paragraph 20. An infrastructure equipment as set out in any of paragraphs 14 to 19, wherein the controller is configured in combination with the transmitter to transmit the supplementary positioning reference signals as one of a group of a plurality of infrastructure equipment, the supplementary positioning reference signals being transmitted differently to one or more supplementary positioning reference signals transmitted by other infrastructure equipment in the plurality of infrastructure equipment or the supplementary reference signals are only transmitted by the infrastructure equipment in the group of infrastructure equipment.

Paragraph 21. An infrastructure equipment as set out in any of paragraphs 14 to 20, wherein an indication of the time units and time and frequency resources in the time units in which the supplementary positioning reference signals are transmitted is communicated to the one or more selected communications devices using radio resource control signalling.

Paragraph 22. An infrastructure equipment as set out in paragraph 21, wherein the indication of the time units and the time and frequency resources in which the supplementary positioning reference signals are transmitted is communicated to the one or more selected communications devices using radio resource control signalling in combination with a downlink control information message.

Paragraph 23. An infrastructure equipment as set out in any of paragraphs 14 to 22, wherein the predetermined conditions for transmitting the supplementary positioning reference signals to the selected one or more communications devices includes detecting a request for a greater location accuracy for the selected one or more communications devices.

Paragraph 24. An infrastructure equipment as set out in paragraph 23, wherein the predetermined conditions for transmitting the supplementary positioning reference signals to the selected one or more communications devices includes receiving an instruction from a location server connected to the wireless access network, the instruction being transmitted in response to detecting that an accuracy of a relative time of arrival of signals transmitted by the communications device does not satisfy a predetermined accuracy requirement.

Paragraph 25. A communications device for transmitting data to or receiving data from a wireless communications network, the communications device comprising:

a transmitter configured to transmit signals to one or more infrastructure equipment of the wireless communications network via a wireless access interface, a receiver configured to receive signals from one or more of the infrastructure equipment of the wireless communications network, the wireless access interface being divided into a plurality of time units each providing time and frequency resources for transmitting the signals and receiving the signals and a plurality of the time divided units include positioning reference signals which are transmitted by a plurality of the infrastructure equipment in accordance with a predetermined pattern, and a controller which is configured with the receiver to determine an observed time difference between a reception of the positioning reference signals transmitted by the plurality of infrastructure equipment, and to transmit an indication of the observed time difference of the received positioning reference signals to the wireless communications network for determining a location of the communications device with respect to a location of the plurality of infrastructure equipment, wherein the controller is configured with the receiver to receive supplementary positioning reference signals for generating the observed time difference reports to assist the location server in determining the location of the communications device.

Paragraph 26. A communications device as set out in paragraph 25, wherein the controller is configured with the transmitter and the receiver to determine the observed time differences of receipt of the positioning reference signals transmitted by the plurality of infrastructure equipment, and to determine the observed time differences of receipt of the supplementary positioning reference signals transmitted by the plurality of infrastructure equipment, and the transmitted indication of the observed time differences includes an indication of the observed time differences of receipt of the positioning reference signals and the supplementary reference signals to the wireless access interface to assist the wireless communications network to determine the location of the communications device.

Paragraph 27. A communications device as set out in paragraph 25 or 26, wherein the controller is configured in combination with the receiver to receive the positioning reference signals and to receive the supplementary positioning reference signals, and to generate more accurate measurements of the observed time difference reports from a combination of the received positioning reference signals and the received supplementary positioning reference signals, the transmitted indication of the observed time differences providing an indication of the more accurately generated observed time differences from the combination of the received positioning reference signals and the received supplementary reference signals.

Paragraph 28. A communications device as set out in paragraph 25, 26 or 27, wherein the controller is configured with the transmitter to transmit a request for the supplementary positioning reference signals to the wireless access interface.

Paragraph 29. A communications device as set out in paragraph 28, wherein the controller is configured with the transmitter to transmit the request for the supplementary positioning reference signals to the wireless access interface if predetermined conditions are satisfied.

Paragraph 30. A communications device as set out in paragraph 29, wherein the predetermined conditions include detecting that an accuracy of observed time differences from the positioning reference signals is below a predetermined threshold.

Paragraph 31. A method of determining a location of a communications device comprising receiving reports of observed time differences of receipt of positioning reference signals transmitted by a plurality of infrastructure equipment from communications devices, the positioning reference signals having been transmitted by the plurality of infrastructure equipment via a wireless access interface, the wireless access interface being divided into a plurality of time units each providing time and frequency resources and a plurality of the time divided units include the positioning reference signals which are transmitted by the plurality of infrastructure equipment, determining a location of the communications devices with respect to a location of the infrastructure equipment from observed time differences between receiving the positioning reference signals transmitted by a plurality of the infrastructure equipment, and transmitting control information to the plurality of the infrastructure equipment to cause the plurality of infrastructure equipment to transmit supplementary positioning reference signals to one or more of the communications devices which are selected for generating the observed time difference reports from the supplementary positioning reference signals as well as the positioning reference signals to assist the location server in determining the location of the selected one or more communications devices.

Paragraph 32. A method of providing measurement reports for determining a location of a communications device comprising determining an observed time difference between a reception of positioning reference signals transmitted by a plurality of infrastructure equipment, the positioning reference signals having been transmitted by the plurality of infrastructure equipment via a wireless access interface, the wireless access interface being divided into a plurality of time units each providing time and frequency resources and a plurality of the time divided units include the positioning reference signals which are transmitted by the plurality of infrastructure equipment, and transmitting an indication of the observed time difference of the received positioning reference signals to the wireless communications network for determining a location of the communications device with respect to a location of the plurality of infrastructure equipment, wherein the determining the observed time differences between a reception of positioning reference signals includes receiving supplementary positioning reference signals for generating the observed time differences to assist the location server in determining the location of the communications device.

Paragraph 33. A communications device for transmitting data to or receiving data from a wireless communications network, the communications device comprising:

a transmitter configured to transmit signals to one or more infrastructure equipment of the wireless communications network via a wireless access interface, a receiver configured to receive signals from one or more of the infrastructure equipment of the wireless communications network, the wireless access interface being divided into a plurality of time units each providing time and frequency resources for transmitting the signals and receiving the signals and a plurality of the time divided units include positioning reference signals which are transmitted by a plurality of the infrastructure equipment in accordance with a predetermined pattern, and a controller which is configured with the receiver to determine an observed time difference between a reception of the positioning reference signals transmitted by the plurality of infrastructure equipment, and to transmit an indication of the observed time difference of the received positioning reference signals to the wireless communications network for determining a location of the communications device with respect to a location of the plurality of infrastructure equipment, wherein the controller is configured to monitor one or more measurements indicative of a relative movement of the communications device and in accordance with a relative movement of the communications device the controller is configured to adapt either the transmitting of the observed time difference to the wireless communications network or to adapt the determining the observed time difference of the received positioning reference signals from the plurality of infrastructure equipment and the transmitting of the observed time difference to the wireless communications network.

Paragraph 34. A communications device as set out in paragraph 33, wherein the controller is configured in combination with the transmitter and the receiver to determine from the one or more monitored measurements a relative rate of movement of the communications device, and the adapting of the transmitting of the observed time difference comprises adapting a rate of transmitting the observed time difference to the wireless communications network.

Paragraph 35. A communications device as set out in paragraph 34, wherein the controller is configured in combination with the transmitter and the receiver to adapt the determining of the observed time difference of the received positioning reference signals from the plurality of infrastructure equipment in accordance with the determined relative rate of movement of the communications device, the rate of determining of the observed time difference being reduced for a lower relative mobility, and the adaptation of the transmitting of the observed time difference comprises adapting the rate of transmitting the observed time difference to the wireless communications network in correspondence with the rate of determining of the observed time difference.

Paragraph 36. A communications device as set out in any of paragraphs 33 to 35, wherein the one or more monitored measurements indicative of the relative movement of the communications device includes the observed time difference of the received positioning reference signals from the plurality of infrastructure equipment, and the controller is configured in combination with the transmitter and the receiver
to compare two samples of the observed time difference with respect to a threshold and if the difference between the two samples of the observed time difference does not exceed the threshold,
to adapt the transmitting of the observed time difference to the wireless communications network by not transmitting the observed time differences to the wireless communications network Paragraph 37. A communications device as set out in paragraph 33, wherein the one or more monitored measurements indicative of the relative movement of the communications device includes the one or more parameters of signals received from one or more of the plurality of infrastructure equipment, and the controller is configured in combination with the transmitter and the receiver
to determine whether the one or more parameters of the received signals from the one or more infrastructure equipment have changed for two samples of the one or more parameters of the received signals, and
if the one or more parameters of the received signals have changed, to adapt the transmitting of the observed time difference to the wireless communications network by not transmitting the observed time differences to the wireless communications network for lower relative movement of the communications device when the two successive samples of the one or more parameters of the received signals have not changed substantially.

Paragraph 38. A communications device as set out in paragraph 36, wherein the controller is configured in combination with the transmitter and the receiver
to adapt the determining the observed time difference of the received positioning reference signals from the plurality of infrastructure equipment by not determining the observed time difference of the positioning reference signals received from the plurality of infrastructure equipment if the one or more parameters of the received signals indicate a relatively low movement of the communications device.

Paragraph 39. A communications device as set out in any of paragraphs 33 to 38, wherein the monitored measurements indicative of the relative movement of the communications device includes a signal strength of reference signals received from one of the infrastructure equipment, a change of the received signal strength being indicative of the relative movement.

Paragraph 40. A communications device as set out in any of paragraphs 33 to 39, wherein the monitored measurements indicative of the relative movement of the communications device includes a signal strength of reference signals received from the plurality of infrastructure equipment, a change of the received signal strength being indicative of the relative movement of the communications device.

Paragraph 41. A communications device as set out in any of paragraphs 33 to 39, wherein the monitored measurements indicative of the relative movement of the communications device include a power delay profile of signals received by the receiver from the one or more of the infrastructure equipment, a change in the power delay profile of the received signals being indicative of the relative movement of the communications device.

Paragraph 42. A communications device as set out in any of paragraphs 33 to 39, wherein the monitored measurements indicative of the relative movement of the communications device include an indication from the wireless communications network that the communications device should transmit and receive signals via a different infrastructure equipment, or a decision by the controller based on a strength of signals received from one of the infrastructure equipment that the communications device should receive data from a different one of the plurality of infrastructure equipment.

Paragraph 43. A communications device as set out in any of paragraphs 33 to 39, wherein the monitored measurements indicative of the relative movement of the communications device includes a signal received by the controller indicative of a monitored beacon signal transmitted by a device present at a location, a loss of reception of the beacon signal being indicative of the relative movement of the communications device.

Paragraph 44. A communications device for transmitting data to or receiving data from a wireless communications network, the communications device comprising:
a transmitter configured to transmit signals to one or more infrastructure equipment of the wireless communications network via a wireless access interface,
a receiver configured to receive signals from one or more of the infrastructure equipment of the wireless communications network, the wireless access interface being divided into a plurality of time units each providing time and frequency resources for transmitting the signals and receiving the signals and a plurality of the time divided units include positioning reference signals which are transmitted by a plurality of the infrastructure equipment in accordance with a predetermined pattern, and a controller which is configured with the receiver to monitor one or more signals indicative of a relative movement of the communications device and in accordance with a rate of relative movement of the communications device the controller is configured to determine an observed time difference between a reception of the positioning reference signals transmitted by the plurality of infrastructure equipment, and to transmit an indication of the observed time difference of the received positioning reference signals to the wireless communications network for determining a location of the communications device with respect to a location of the plurality of infrastructure equipment at a rate which is adapted in accordance with the rate of relative movement of the communications device.

Paragraph 45. A communications device as set out in paragraph 44, wherein the controller is configured with the receiver and the transmitter to determine the observed time difference between the reception of the positioning reference signals transmitted by the plurality of infrastructure equipment at a rate which is proportional to the rate of relative movement of the communications device.

Paragraph 46. A communications device as set out in paragraph 44 or 45, wherein the rate of relative movement comprises either indicating that the communications device is moving or that the communications device is stationary, and the adapting the transmitting the observed time difference or the determining the observed time difference comprises not transmitting the observed time difference or not determining the observed time difference when the communications device is stationary.

Paragraph 47. A method of reporting observed time differences of received reference signals for determining a location of a communications device comprising a transmitter configured to transmit signals to one or more infrastructure equipment of the wireless communications network via a wireless access interface, a receiver configured to receive signals from one or more of the infrastructure equipment of the wireless communications network, and a controller which is configured with the receiver monitoring one or more signals indicative of a relative movement of the communications device and in accordance with a rate of relative movement of the communications device, determining an observed time difference between a reception of positioning reference signals transmitted by a plurality of infrastructure equipment, the positioning reference signals being transmitted via a wireless access interface, the wireless access interface being divided into a plurality of time units each providing time and frequency resources for transmitting and receiving signals and a plurality of the time divided units including the positioning reference signals which are transmitted by a plurality of the infrastructure equipment in accordance with a predetermined pattern, and transmitting an indication of the observed time difference of the received positioning reference signals to the wireless communications network for determining a location of the communications device with respect to a location of the plurality of infrastructure equipment at a rate which is adapted in accordance with the rate of relative movement of the communications device.

Paragraph 48. A method as set out in paragraph 47, wherein the determining the observed time difference between the reception of the positioning reference signals includes determining the observed time difference between the reception of the positioning reference signals transmitted by the plurality of infrastructure equipment at a rate which is proportional to the rate of relative movement of the communications device.

Paragraph 49. A method as set out in paragraph 47 or 48, wherein the rate of relative movement comprises either indicating that the communications device is moving or that the communications device is stationary, and the adapting the transmitting the observed time difference or the determining the observed time difference comprises not transmitting the observed time difference or not determining the observed time difference when the communications device is stationary.

REFERENCES

[1] LTE for UMTS: OFDMA and SC-FDMA Based Radio Access, Harris Holma and Antti Toskala, Wiley 2009, ISBN 978-0-470-99401-6.
[2] RP-161324, "New work item proposal: Enhancements of NB-IoT," Vodafone, Huawei, HiSilicon, Ericsson, Qualcomm, RAN #72
[3] RP-161321, "New WI proposal on Further Enhanced MTC", Ericsson, RAN #72
[4] TS36.133, "EUTRA: Requirements for support of radio resource management (Rel-13)," v13.3.0, ETSI

The invention claimed is:

1. A method, comprising:
receiving, from a communications device, first reports of observed time differences of receipt of positioning reference signals transmitted from a plurality of infrastructure equipment via a wireless access interface at a rate which is proportional to a rate of relative movement of the communications device, the wireless access interface being divided into a plurality of time units each providing time and frequency resources and a plurality of the time divided units including the positioning reference signals;
determining, by a location server, a location of the communications device with respect to a location of one or more infrastructure equipment of the plurality of infrastructure equipment from observed time differences between times of receiving the positioning reference signals;
transmitting control information to the plurality of the infrastructure equipment to instruct the plurality of infrastructure equipment to transmit supplementary positioning reference signals to the communications device, the transmitting being performed in response to detecting a requirement for greater location accuracy for the communications device, and the transmitting being performed in response to receiving first reports with missing observed time difference measurements for certain infrastructure equipment or with observed time difference measurements of low quality;
receiving, from the communications device, second reports of observed time difference from the supplementary positioning reference signals, combining the first reports and the second reports to assist the location server in determining an updated location of the communications device; and indicating a pattern of resource elements used to transmit the supplementary positioning reference signals or a number of resource elements used to transmit the supplementary positioning reference signals per infrastructure equipment.

2. The method of claim 1, wherein the rate of relative movement comprises indicating that the communications device is moving or that the communications device is stationary.

3. The method of claim 1, wherein the supplementary positioning reference signals are transmitted for a number of time units of the wireless access interface.

4. The method of claim 3, wherein the number of time units is determined based on a requirement for improving accuracy of the location of the communications device.

5. The method of claim 1, wherein the transmitting the control information is in response to receiving a request from the communications device.

6. The method of claim 5, wherein the request is sent using uplink control information at a physical layer.

7. The method of claim 5, wherein the request using radio resource control signaling.

8. The method of claim 1, wherein each supplementary positioning reference signal of the supplementary positioning reference signals is transmitted differently by a corresponding infrastructure equipment of the plurality of infrastructure equipment.

9. The method of claim 1, wherein the supplementary positioning reference signals are transmitted by one infrastructure equipment of the plurality of infrastructure equipment.

10. The method of claim 1, further comprising transmitting an indication of the time units and time and frequency resources in which the supplementary positioning reference signals are transmitted to the communications device using radio resource control signaling.

11. The method of claim 1, wherein the supplementary positioning reference signals are transmitted by a subset of the plurality of infrastructure equipment.

12. The method of claim 1, further comprising indicating a start and stop time for transmission of the supplementary positioning reference signals.

13. An apparatus, comprising:
processing circuitry configured to
receive, from a communications device, first reports of observed time differences of receipt of positioning reference signals transmitted from a plurality of infrastructure equipment via a wireless access interface at a rate which is proportional to a rate of relative movement of the communications device, the wireless access interface being divided into a plurality of time units each providing time and frequency resources and a plurality of the time divided units including the positioning reference signals;
determine a location of the communications device with respect to a location of one or more infrastructure equipment of the plurality of infrastructure equipment from observed time differences between times of receiving the positioning reference signals;

transmit control information to the plurality of the infrastructure equipment to instruct the plurality of infrastructure equipment to transmit supplementary positioning reference signals to the communications device, the transmission being performed in response to detecting a requirement for greater location accuracy for the communications device, and the transmission being performed in response to receiving first reports with missing observed time difference measurements for certain infrastructure equipment or with observed time difference measurements of low quality;
receive, from the communications device, second reports of observed time difference from the supplementary positioning reference signals;
combine the first reports and the second reports to assist the location server in determining an updated location of the communications device; and
indicate a pattern of resource elements used to transmit the supplementary positioning reference signals or a number of resource elements used to transmit the supplementary positioning reference signals per infrastructure equipment.

14. A method, comprising:
receiving, from a communications device, first reports of observed time differences of receipt of positioning reference signals transmitted from a plurality of infrastructure equipment via a wireless access interface at a rate which is proportional to a rate of relative movement of the communications device, the wireless access interface being divided into a plurality of time units each providing time and frequency resources and a plurality of the time divided units including the positioning reference signals;
determining, by a location server, a location of the communications device with respect to a location of one or more infrastructure equipment of the plurality of infrastructure equipment from observed time differences between times of receiving the positioning reference signals;
transmitting, in response to detecting a requirement for greater location accuracy for the communications device, control information to the plurality of the infrastructure equipment to instruct the plurality of infrastructure equipment to transmit supplementary positioning reference signals to the communications device, wherein the supplementary positioning reference signals are transmitted for a number of time units of the wireless access interface, and the number of time units being based on a requirement for improving accuracy of the location of the communications device;
receiving, from the communications device, second reports of observed time difference from the supplementary positioning reference signals;
combining the first reports and the second reports to assist the location server in determining an updated location of the communications device; and
indicating a pattern of resource elements used to transmit the supplementary positioning reference signals or a number of resource elements used to transmit the supplementary positioning reference signals per infrastructure equipment.

* * * * *